(12) United States Patent
Kim et al.

(10) Patent No.: US 12,200,751 B2
(45) Date of Patent: Jan. 14, 2025

(54) BUFFER REPORT FOR LOW LATENCY

(71) Applicant: LG ELECTRONICS INC., Seoul (KR)

(72) Inventors: Suhwook Kim, Seoul (KR); Jeongki Kim, Seoul (KR); Jinsoo Choi, Seoul (KR); Sanggook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 331 days.

(21) Appl. No.: 17/639,851

(22) PCT Filed: May 28, 2020

(86) PCT No.: PCT/KR2020/006919
§ 371 (c)(1),
(2) Date: Mar. 2, 2022

(87) PCT Pub. No.: WO2021/045348
PCT Pub. Date: Mar. 11, 2021

(65) Prior Publication Data
US 2022/0330262 A1  Oct. 13, 2022

Related U.S. Application Data

(60) Provisional application No. 62/896,537, filed on Sep. 5, 2019, provisional application No. 62/896,542, filed on Sep. 5, 2019, provisional application No. 62/896,540, filed on Sep. 5, 2019.

(51) Int. Cl.
*H04W 72/543* (2023.01)
*H04W 28/02* (2009.01)
*H04W 84/12* (2009.01)

(52) U.S. Cl.
CPC ..... *H04W 72/543* (2023.01); *H04W 28/0278* (2013.01); *H04W 84/12* (2013.01)

(58) Field of Classification Search
CPC .......... H04W 72/543; H04W 28/0278; H04W 84/12
See application file for complete search history.

(56) References Cited

U.S. PATENT DOCUMENTS

| | | |
|---|---|---|
| 8,547,846 B1 | 10/2013 | Ma et al. |
| 2013/0235836 A1* | 9/2013 | Roh ...................... H04L 1/0004 370/329 |
| 2014/0376427 A1 | 12/2014 | Hui et al. |
| 2016/0285608 A1* | 9/2016 | Kwon ...................... H04L 1/18 |
| 2019/0165890 A1 | 5/2019 | Pietraski et al. |
| 2019/0215884 A1 | 7/2019 | Patil et al. |

(Continued)

OTHER PUBLICATIONS

Suhwook Kim, et al., Latency analysis for EHT, IEEE 802.11-19/0762r1, Jul. 15, 2019, see slides 7 and 20.

*Primary Examiner* — Ajay Cattungal
(74) *Attorney, Agent, or Firm* — BRYAN CAVE LEIGHTON PAISNER LLP

(57) ABSTRACT

In a wireless local area network (LAN) system, a station (STA) may transmit a first physical protocol data unit (PPDU) including information related to low latency traffic. The low latency traffic may be traffic requiring a latency less than or equal to a threshold value. A resource for the low latency traffic may be allocated to the STA. The STA may transmit, via the resource, a second PPDU including the low latency traffic.

7 Claims, 28 Drawing Sheets

(a)

(b)

(56) References Cited

U.S. PATENT DOCUMENTS

| | | | |
|---|---|---|---|
| 2020/0029350 A1* | 1/2020 | Asterjadhi | H04W 72/543 |
| 2020/0077421 A1* | 3/2020 | Asterjadhi | H04L 5/006 |
| 2020/0187011 A1* | 6/2020 | Malichenko | H04W 24/10 |
| 2022/0225323 A1* | 7/2022 | Wang | H04W 74/06 |

* cited by examiner

FIG. 1
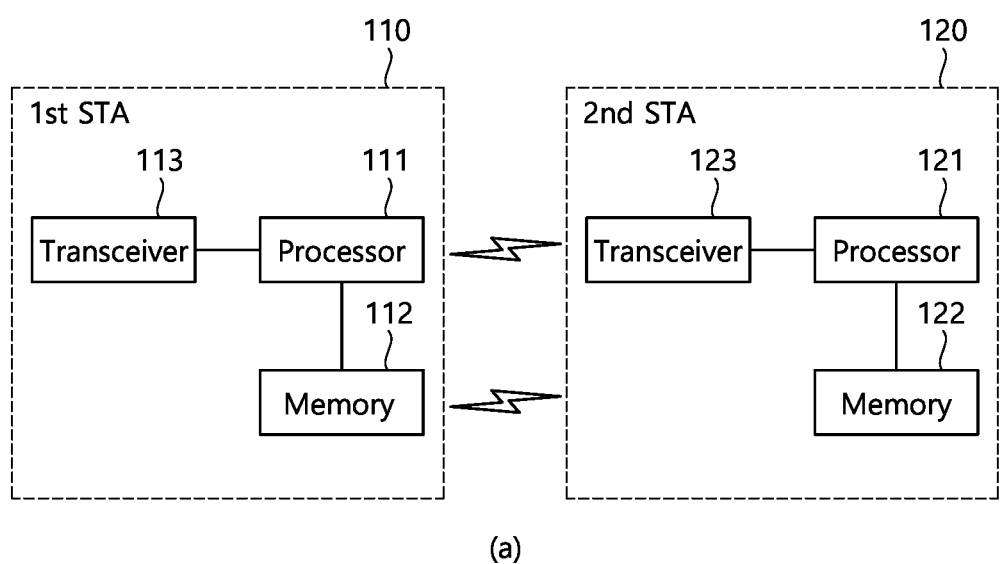
(a)
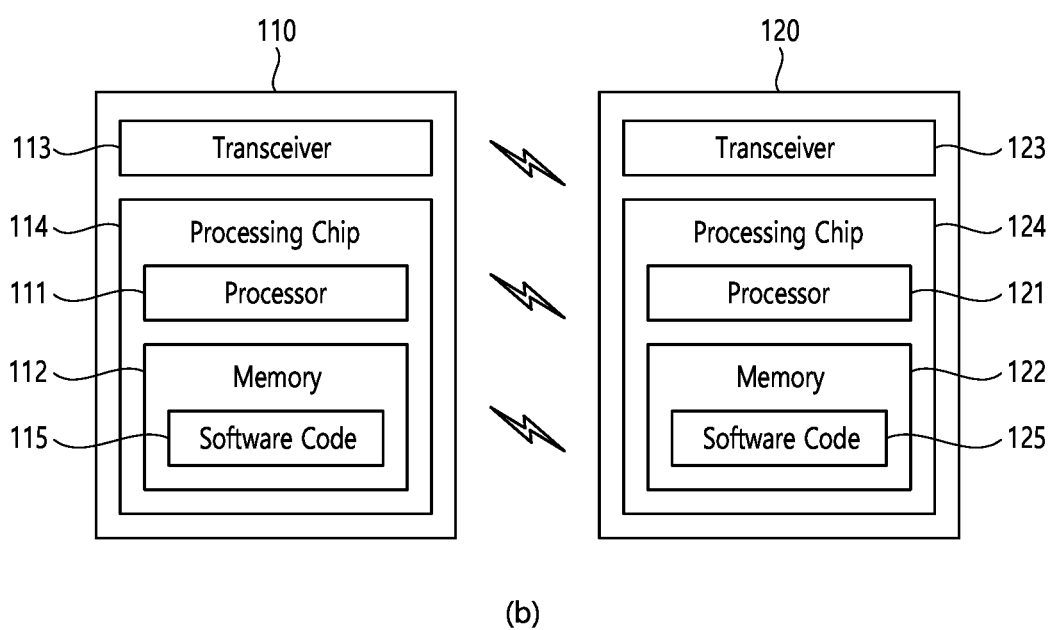
(b)

FIG. 2
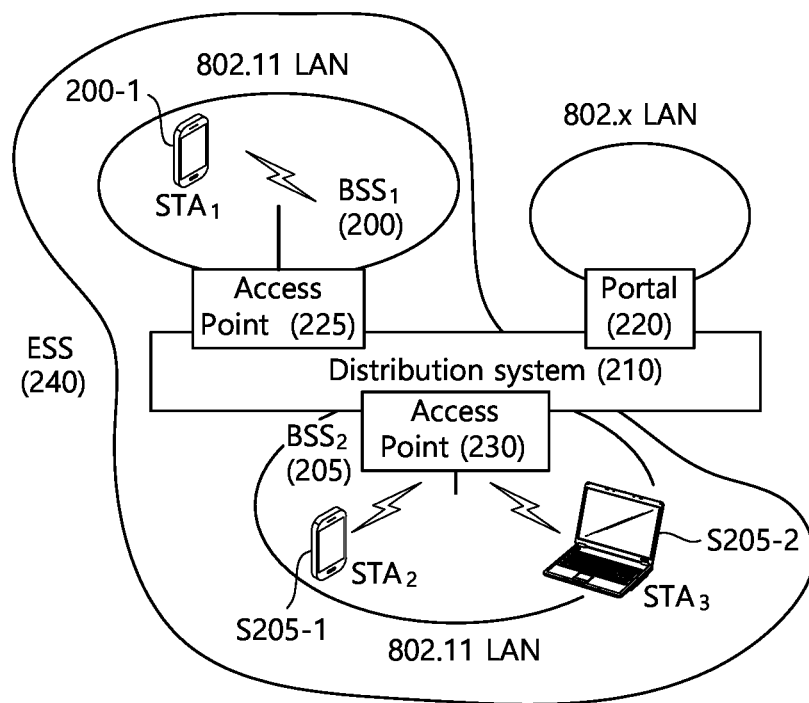
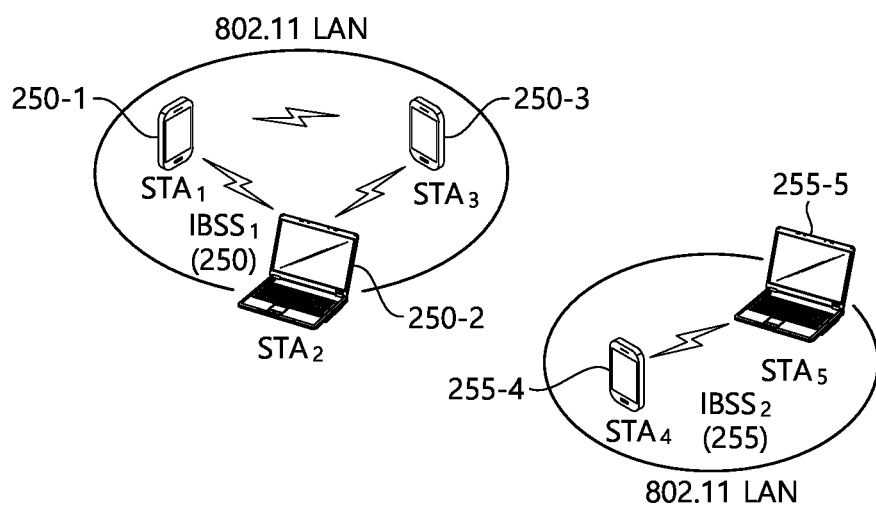

FIG. 4
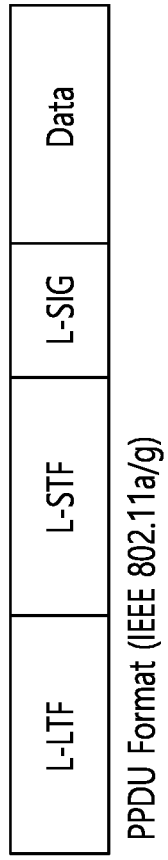
PPDU Format (IEEE 802.11a/g)
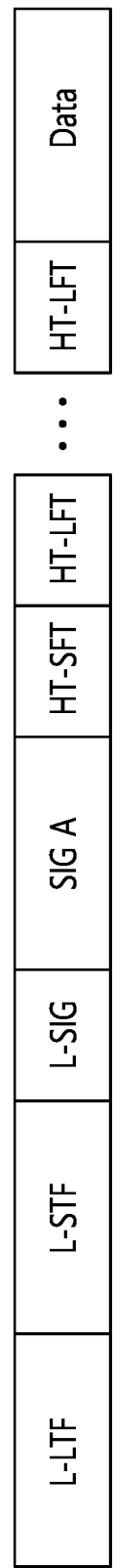
HT PPDU Format (IEEE 802.11n)
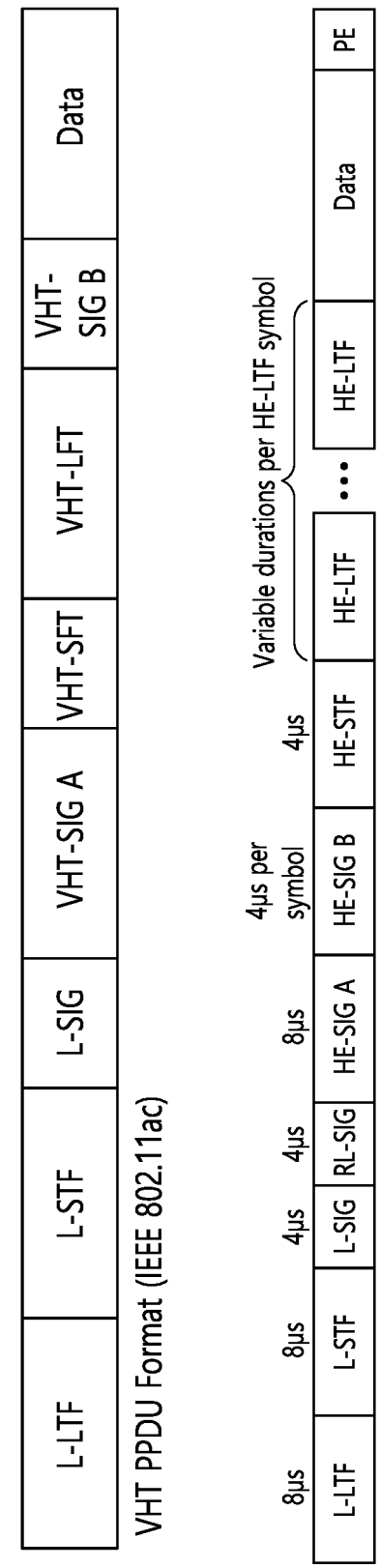
VHT PPDU Format (IEEE 802.11ac)

FIG. 18

| 8μs | 8μs | 4μs | 4μs | | | | | | |
|---|---|---|---|---|---|---|---|---|---|
| L-LTF | L-STF | L-SIG | RL-SIG | SIG A | SIG B | STF | LTF | Data | PE |

FIG. 25

| B0 | B3 | B4 | B5 | B6 | B7 | B8 | B9 | B10 | B17 | B18 | B25 |
|---|---|---|---|---|---|---|---|---|---|---|---|
| ACI Bitmap | | Delta TID | | ACI High | | Scaling Factor | | Queue Size High | | Queue Size All | |
| Bits: 4 | | 2 | | 2 | | 2 | | 8 | | 8 | |

FIG. 26

| Packet arrival time | Packet size |

BUFFER REPORT FOR LOW LATENCY

This application is the National Stage filing under 35 U.S.C. 371 of International Application No. PCT/KR2020/006919 filed on May 28, 2020, which claims priority to U.S. Provisional Application Nos. 62/896,537 filed on Sep. 5, 2019; 62/896,542 filed on Sep. 5, 2019 and 62/896,540 filed on Sep. 5, 2019, the contents of which are all hereby incorporated by reference herein in their entirety.

BACKGROUND

Technical Field

The present specification relates to a method for a buffer status report for low latency in a wireless local area network system.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Solutions

A method performed by a station (STA) in a wireless local area network system according to various embodiments may include technical features related to buffer status reporting for low latency. A station (STA) may transmit a first physical protocol data unit (PPDU) including information related to low latency traffic. The low latency traffic may be traffic requiring a latency less than or equal to a threshold value. The STA may receive an allocation of a resource for the low latency traffic. The STA may transmit a second PPDU including the low latency traffic via the resource.

Technical Effects

According to an embodiment of the present specification, buffer status information related to low latency traffic may be transmitted. The AP may calculate the amount of a resource required to transmit data, which the STA has, through the buffer state information related to the low latency traffic. Therefore, the AP may allocate a resource to the STA based on the buffer state related to the low latency traffic. Therefore, the STA can smoothly transmit traffic requiring low latency.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 4 illustrates an example of a PPDU used in an IEEE standard.

FIG. 18 illustrates an example of a PPDU used in the present specification.

FIG. 25 is a diagram illustrating an example of a BSR control subfield.

FIG. 26 shows an embodiment of a latency BSR subfield.

DETAILED DESCRIPTION

Figure 3:
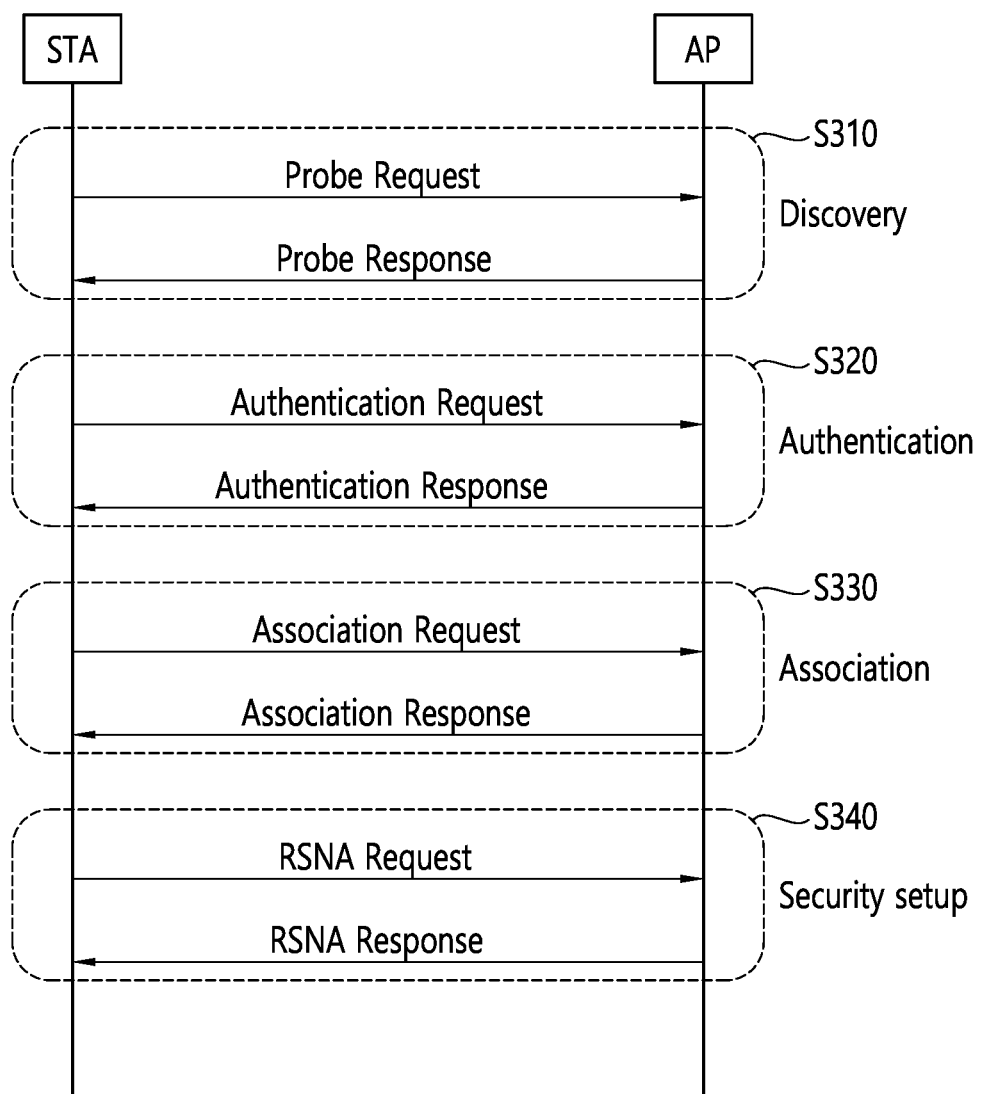
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e. EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e.EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
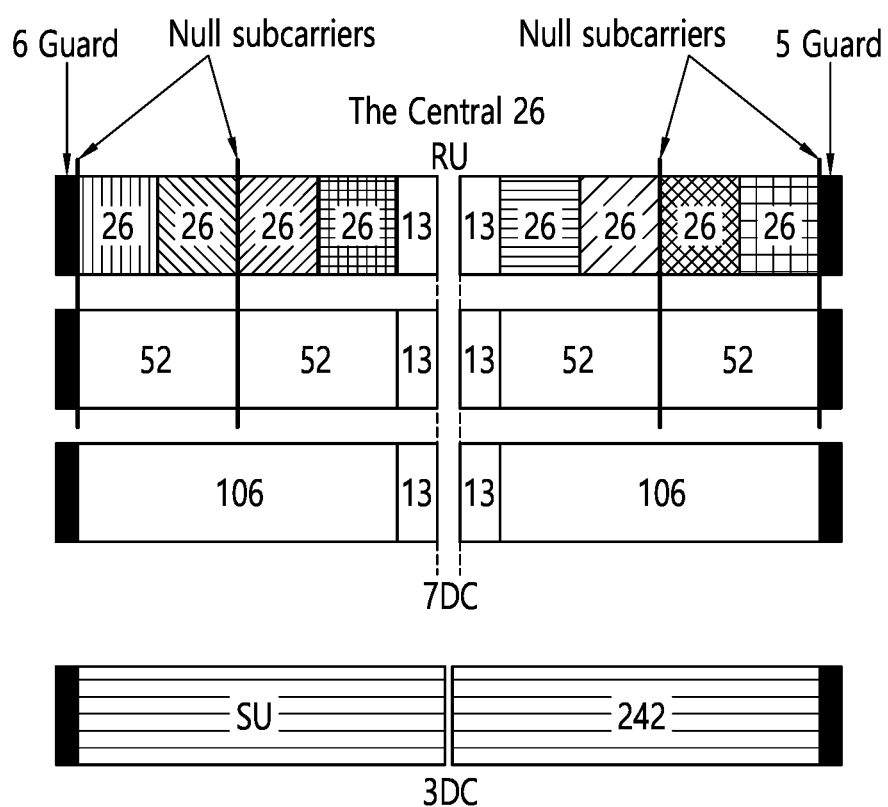
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
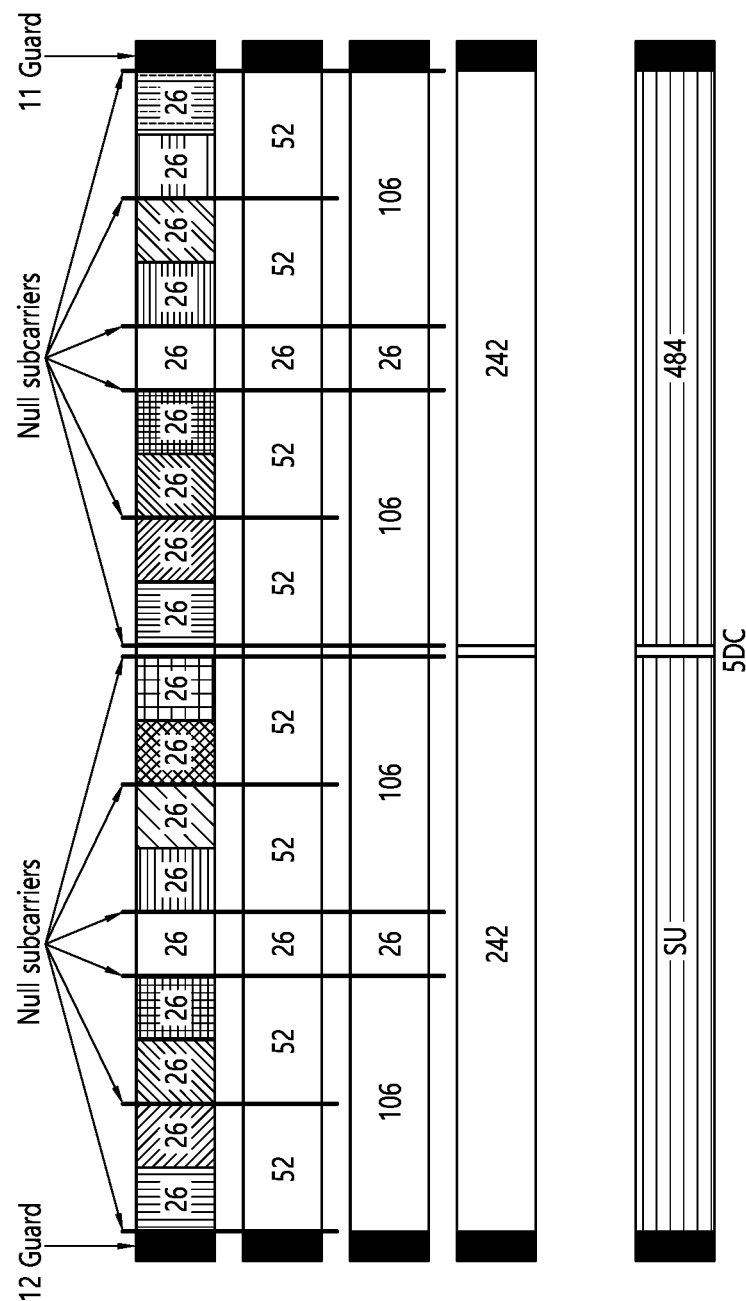
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
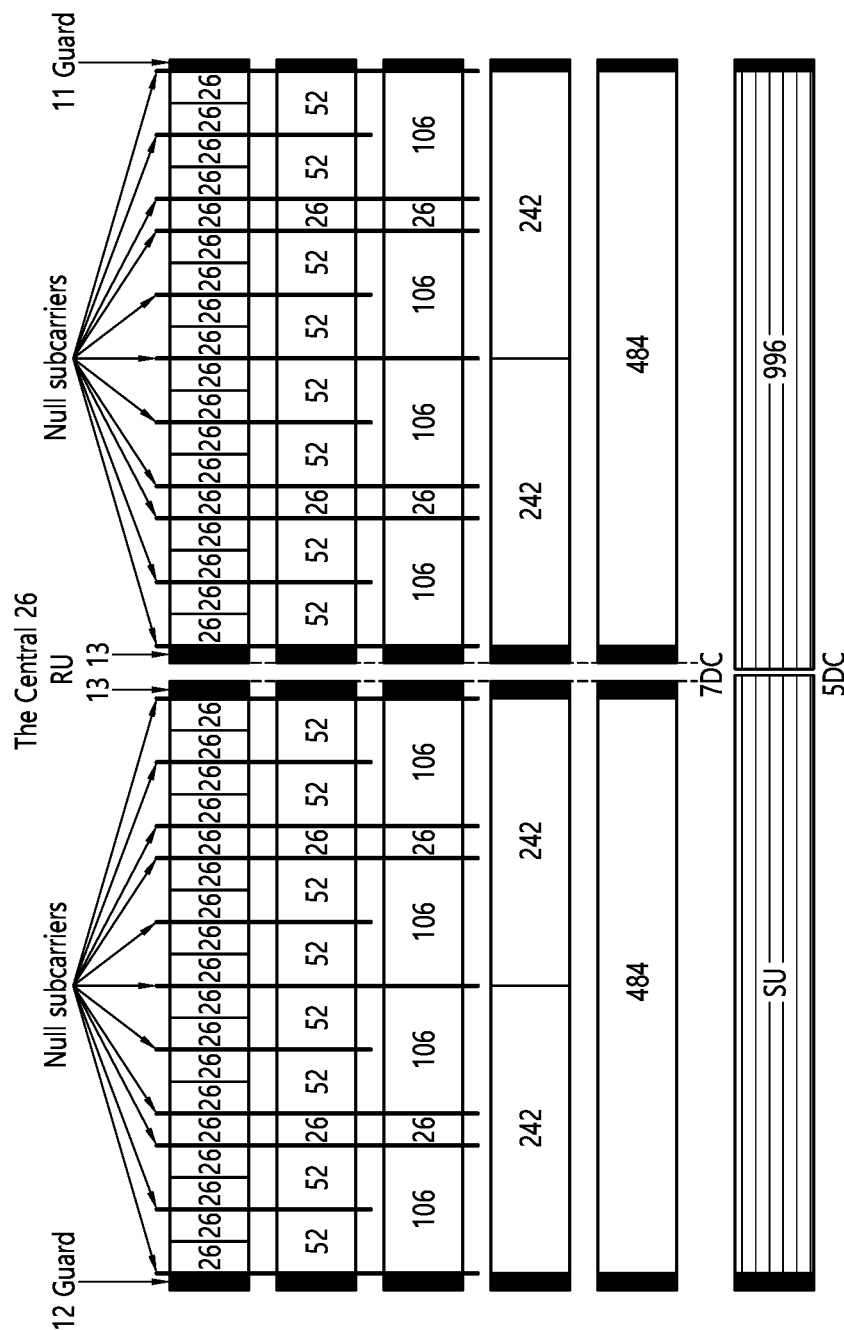
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
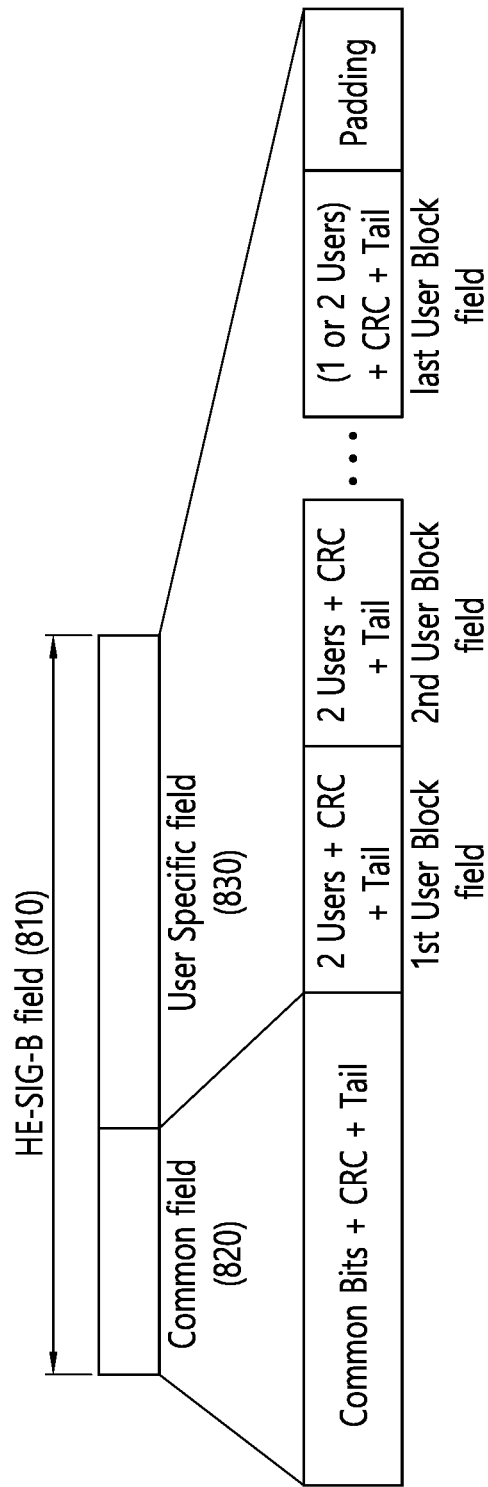
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | 26 | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | 26 | | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | | 106 | | 26 | 26 | 26 | 26 | 26 | 8 |
| 01001$y_2y_1y_0$ | | | 106 | | 26 | 26 | 26 | 52 | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
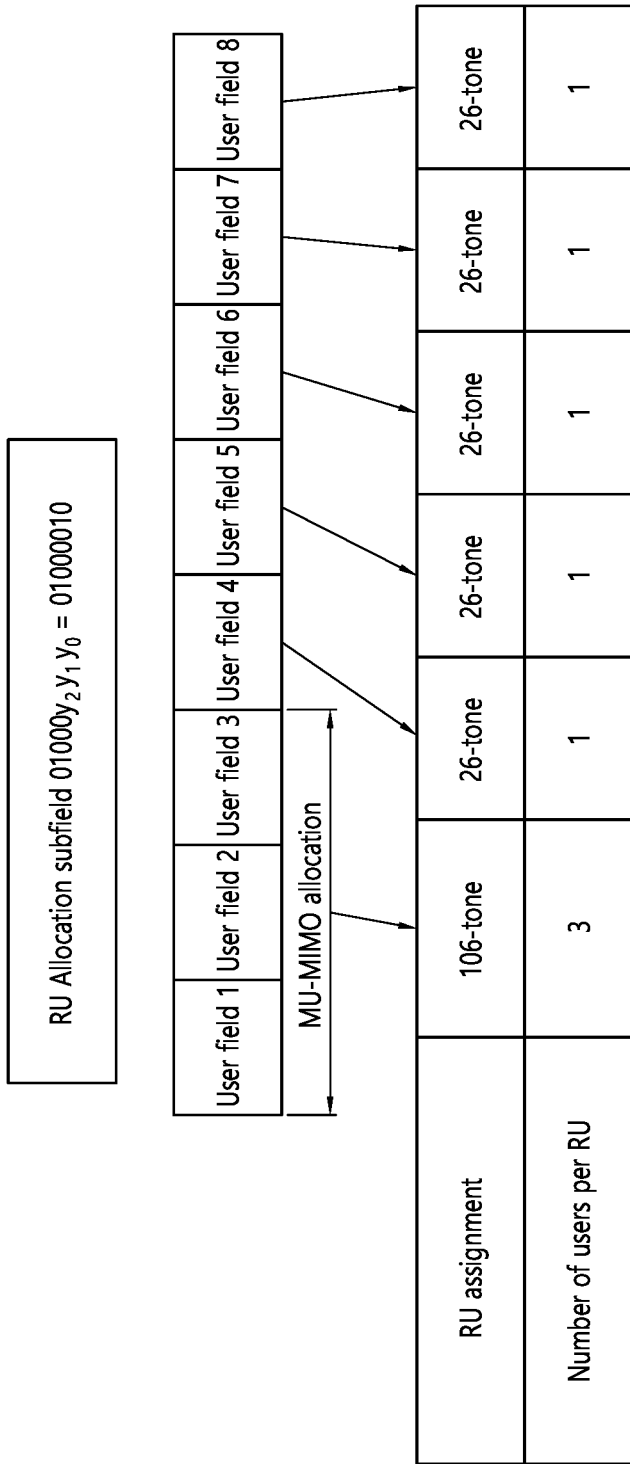
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
| | 0100-0101 | 2-3 | 2 | 1 | 1 | 1 | | | | 7-8 | |
| | 0110 | 2 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.).

Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
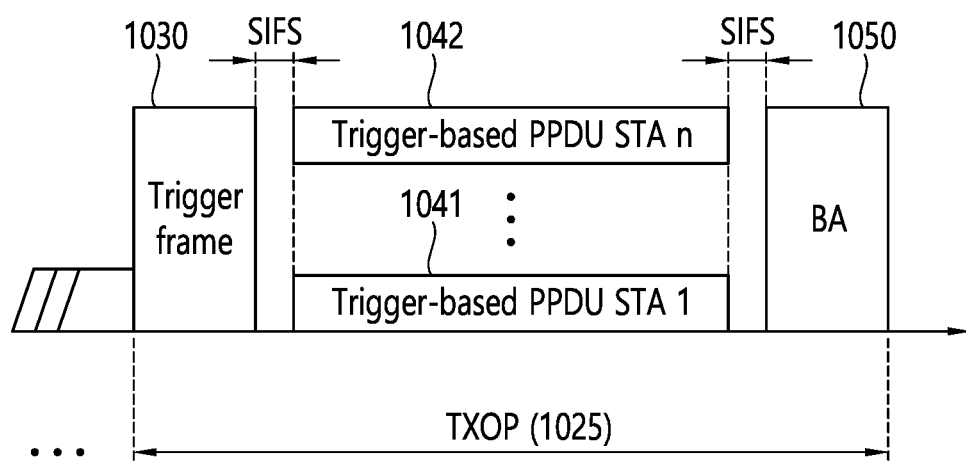
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
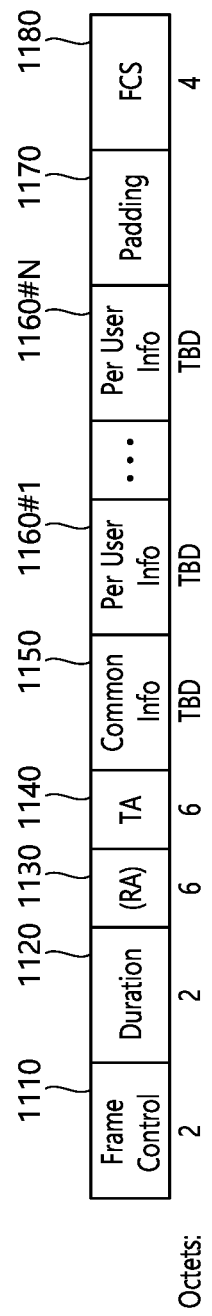
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
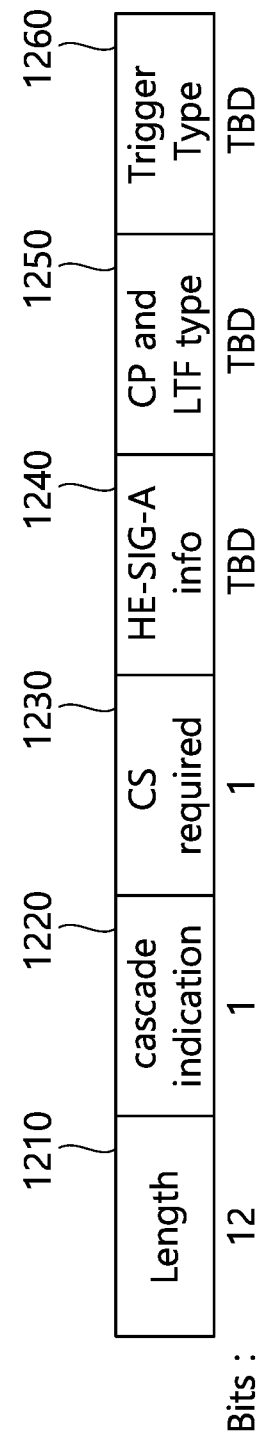
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
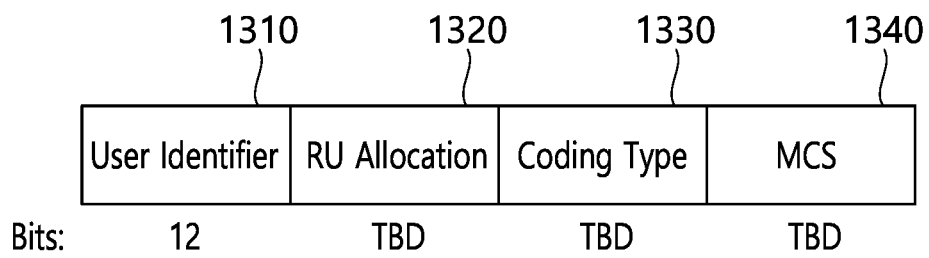
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
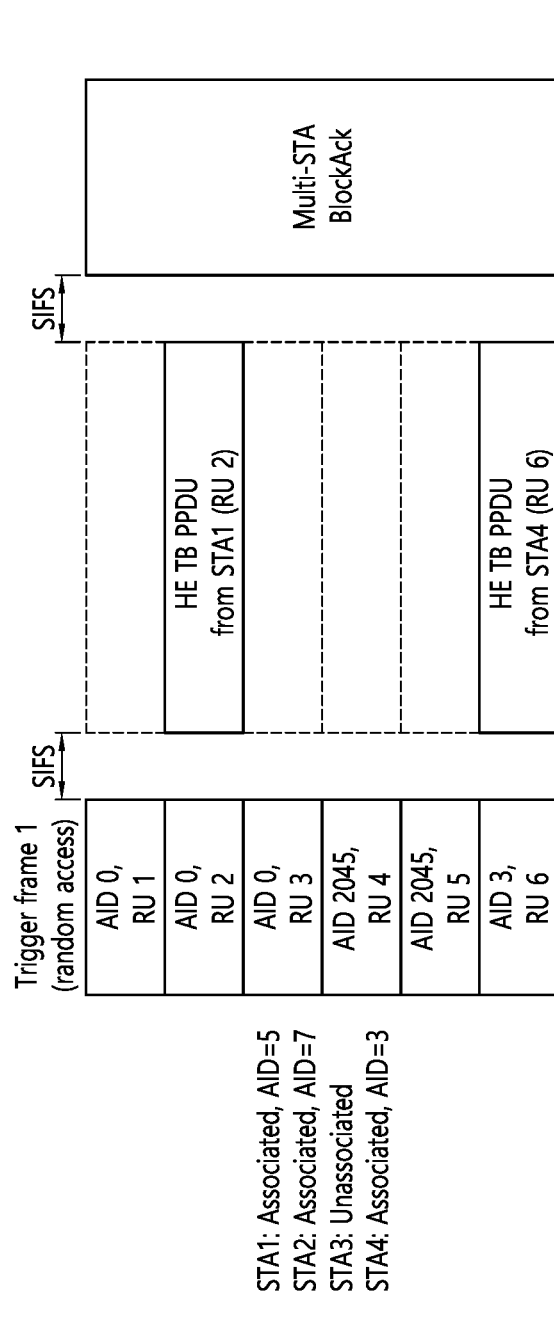
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
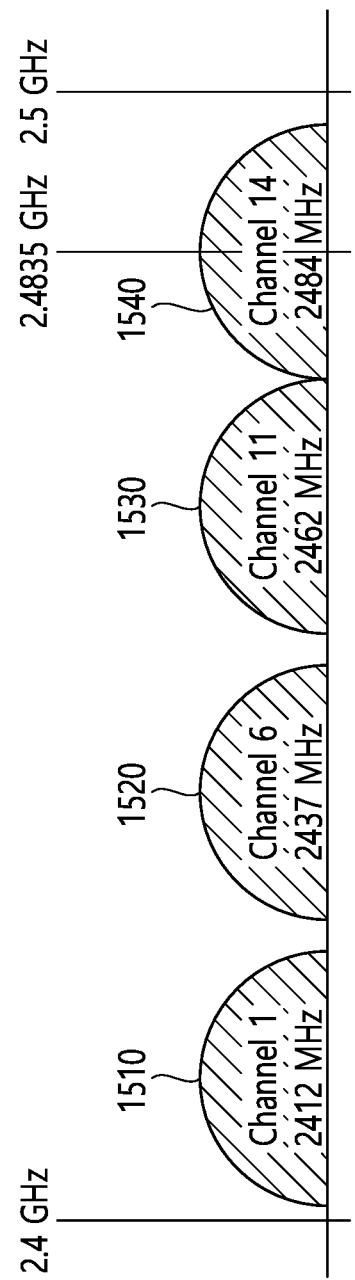
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
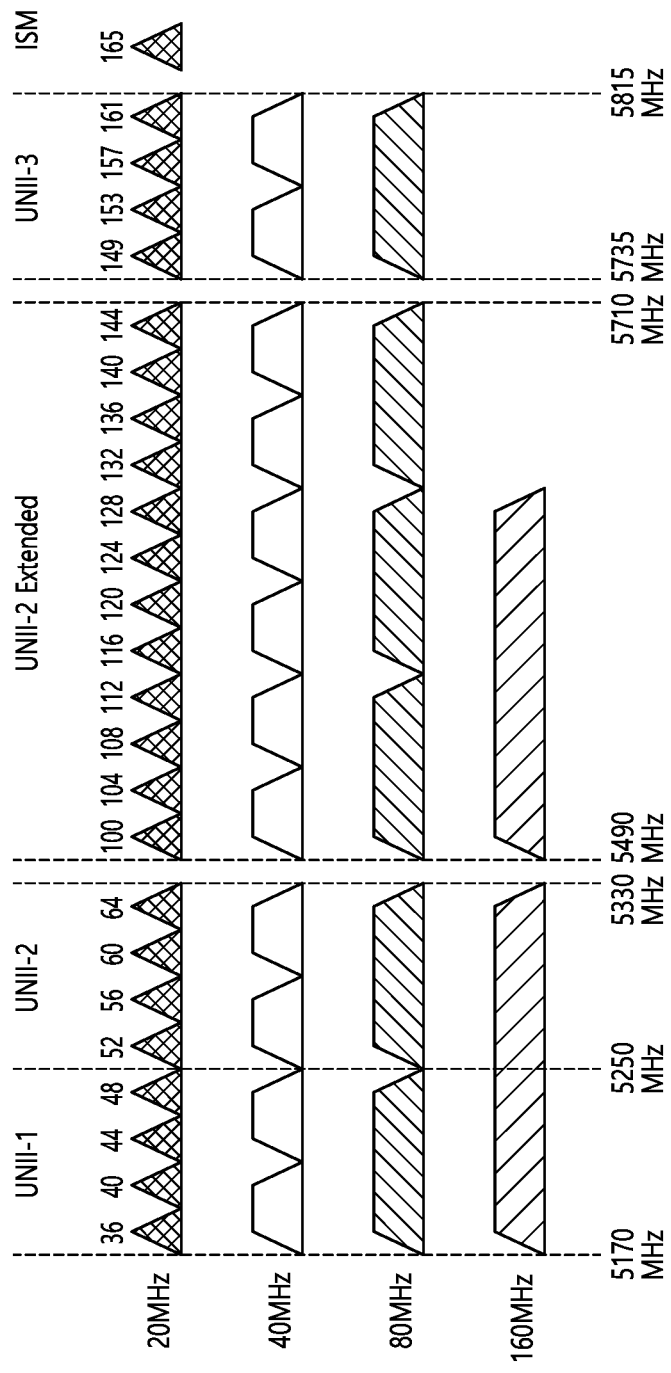
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2 Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
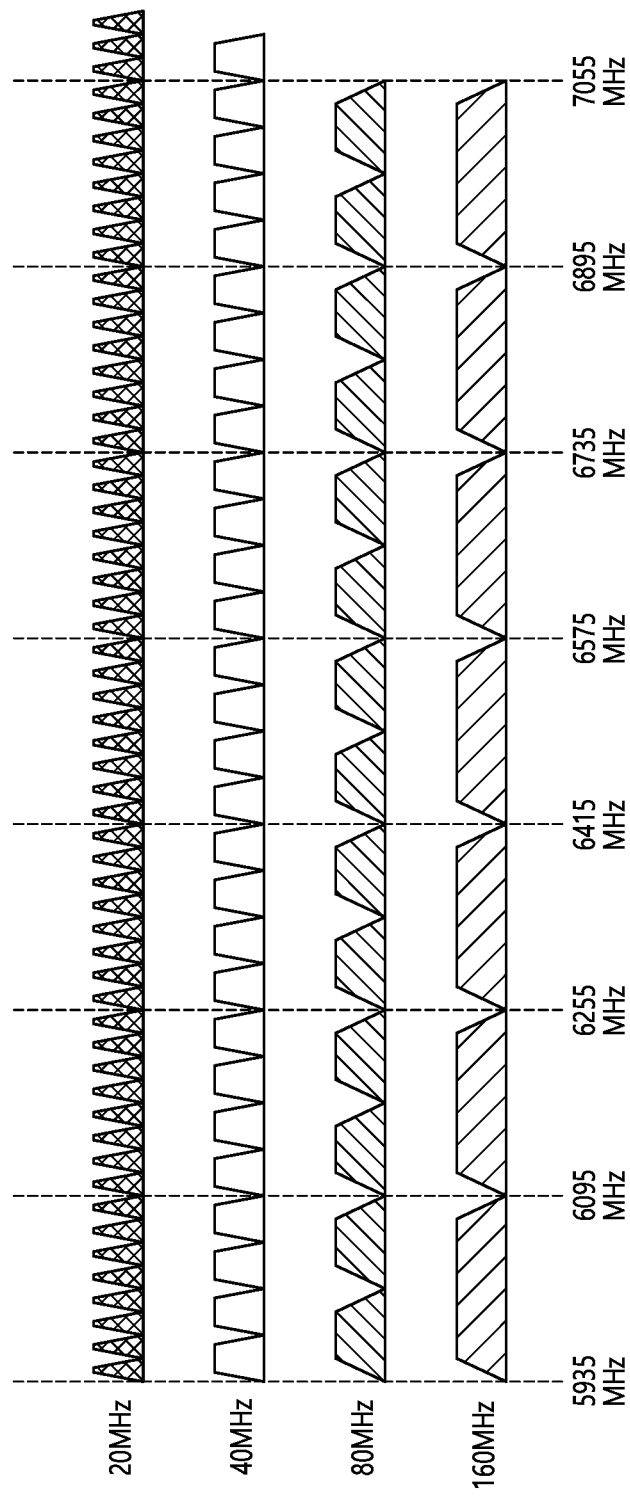
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, an STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After RL-SIG of FIG. 18, for example, an EHT-SIG-A or one control symbol may be inserted. A symbol located after the RL-SIG (i.e., the EHT-SIG-A or one control symbol in the present specification) may be referred as various names, such as a U-SIG (Universal SIG) field.

A symbol consecutive to the RL-SIG (e.g., U-SIG) may include information of N bits, and may include information for identifying the type of the EHT PPDU. For example, the U-SIG may be configured based on two symbols (e.g., two consecutive OFDM symbols). Each symbol (e.g., OFDM symbol) for U-SIG may have a duration of 4 us. Each symbol of the U-SIG may be used to transmit 26-bit information. For example, each symbol of the U-SIG may be transmitted/received based on 52 data tones and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is classified into various types (e.g., EHT PPDU supporting SU, EHT PPDU supporting MU, EHT PPDU related to Trigger Frame, EHT PPDU related to Extended Range transmission, etc.), information related to the type of the EHT PPDU may be included in version-independent bits or version-dependent bits of the U-SIG.

For example, the U-SIG field includes 1) a bandwidth field including information related to a bandwidth, 2) a field including information related an MCS scheme applied to the SIG-B, 3) a dual subcarrier modulation in the SIG-B (i.e., an indication field including information related to whether the dual subcarrier modulation) is applied, 4) a field including information related to the number of symbols used for the SIG-B, 5) a field including information on whether the SIG-B is generated over the entire band, 6) a field including information related to a type of the LTF/STF, and/or 7) information related to a field indicating a length of the LTF and the CP.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1x STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 μs, and a periodicity signal of 3.2 μs may be repeated 5 times to become a second type STF having a length of 16 μs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 μs. In addition, Guard Intervals (GIs) with various lengths (e.g., 0.8/1/6/3.2 μs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
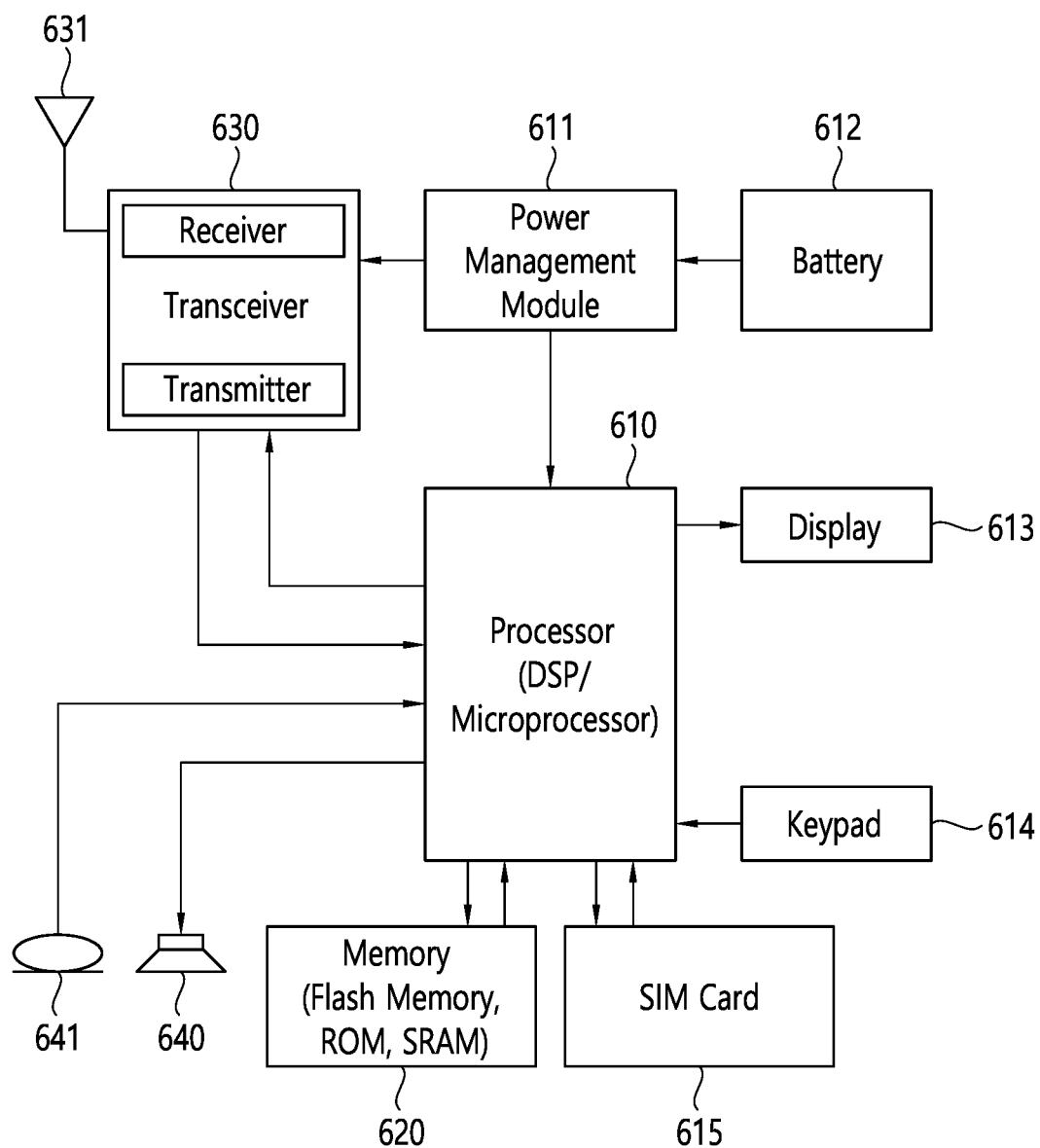
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, technical features applied to a physical (PHY) protocol data unit (PPDU) and a media access control (MAC) PDU (MPDU) in a wireless local area network system will be described.

Figure 20:
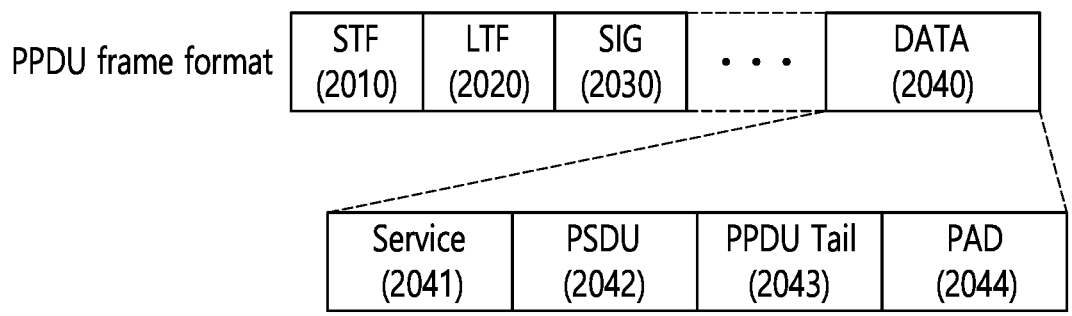
FIG. 20 is a diagram illustrating an embodiment of a PPDU.

FIG. 20 is a diagram illustrating an embodiment of a PPDU.

Referring to FIG. 20, the PPDU may include STF 2010, LTF 2020, SIG 2030, and DATA 2040 fields. The DATA 2040 field may include a Service 2041, a PSDU 2042, a PPDU Tail 2043, and a PAD 2044 fields.

The initial portion of the PPDU may include a short training field (STF) according to the conventional legacy standard. That is, the STF 2010 may be a conventional L-STF. The STF 2010 may be used for diversity detection, coarse frequency/time synchronization, and the like.

An initial portion of the PPDU may include a long training field (LTF) according to a conventional legacy standard. That is, the LTF 2020 may be a conventional L-LTF. The LTF 2020 may include a long training orthogonal frequency division multiplexing (OFDM) symbol. The LTF 2020 may be used for fine frequency/time synchronization and channel prediction.

An initial portion of the PPDU may include a signal (SIG) field according to the conventional legacy standard. That is, the SIG 2030 field may be a conventional L-SIG field.

The data field 2040 may include a SERVICE field 2041, a PHY service data unit (PSDU) 2042, a PPDU TAIL bit 2043, and a padding bit 2044. Some bits of the SERVICE field 2041 may be used for synchronization of the descrambler at the receiving terminal. The PSDU 2042 may correspond to a MAC protocol data unit (MPDU) defined in the MAC layer, and may include data generated/used in a higher layer. The PPDU TAIL bit 2043 may be used to return the encoder to a 0 state. The padding bit 2044 may be used to adjust the length of the data field to a specific unit.

Figure 21:
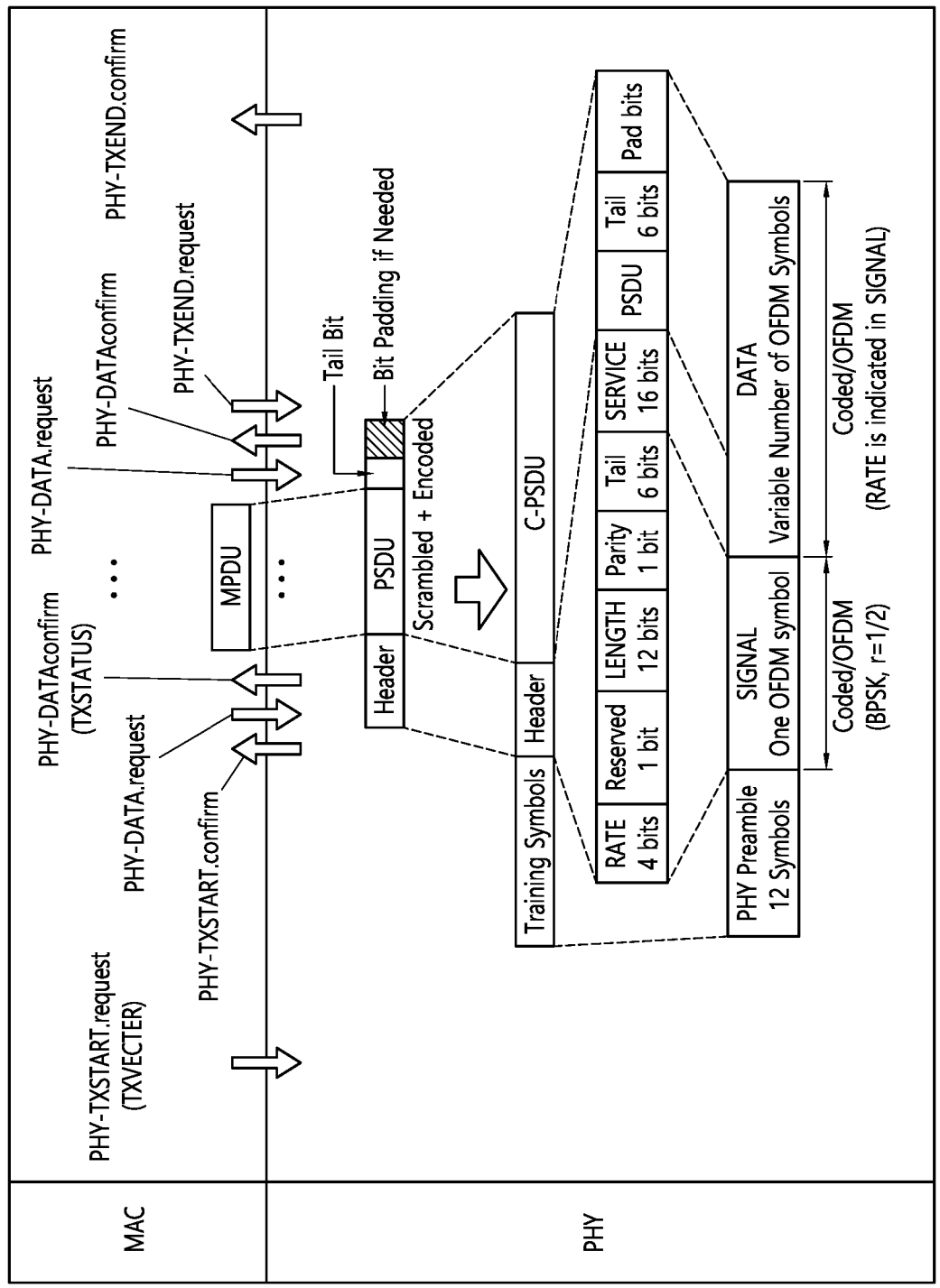
FIG. 21 is a diagram illustrating an embodiment of a PPDU, a PHY service data unit (PSDU), and a MAC PDU (MPDU).

FIG. 21 is a diagram illustrating an embodiment of a PPDU, a PHY service data unit (PSDU), and a MAC PDU (MPDU).

Referring to FIG. 21, the relationship between PPDU, PSDU, and MPDU may vary according to WLAN standards. For example, various PHY preambles/midambles may be added between the signal (SIG) field and the data field of FIG. 21. A specific numerical value (for example, the number of bits) of FIG. 21 may be changed.

The MAC layer of the transmitting STA may request transmission of the MPDU to the PHY layer. A PSDU may correspond to an MPDU, and a header (that is, a PHY header) may be included in the front part of the PSDU. A tail bit and/or a padding bit may be included in the end part of the PSDU.

Scrambling and coding may be applied to PSDU. As a result, the PHY header and PSDU of FIG. 21 may be converted into the SIG field and data field of FIG. 20.

Figure 22:
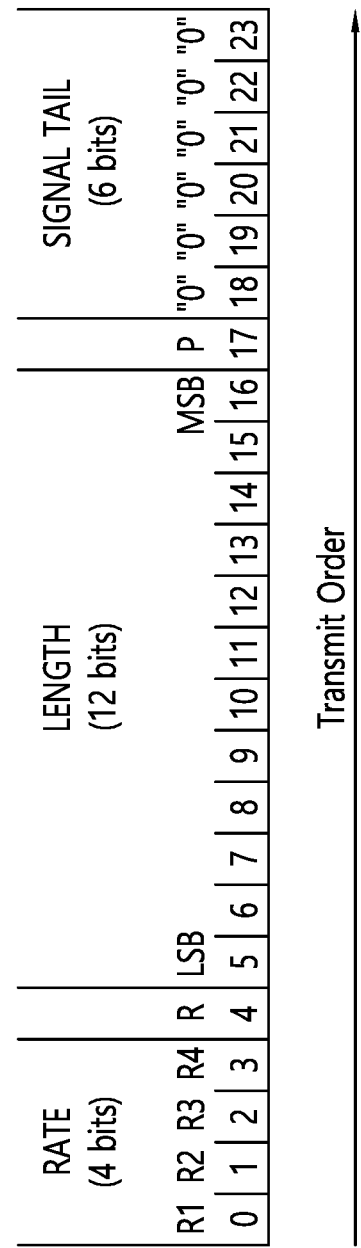
FIG. 22 is a diagram illustrating an embodiment of the SIG 2030 field.

FIG. 22 is a diagram illustrating an embodiment of the SIG 2030 field.

Referring to FIG. 22, the SIG 2030 field may include 24-bit information. The RATE field of the SIG 2030 field may consist of 4 bits and may include information on the RATE defined in the Mb/s unit. The R field of the SIG 2030 field may consist of 1 bit, may be a reserved field, and may be used for various purposes. The length field of the SIG 2030 field may include information about the number of octets of a physical service data unit (PSDU) transmitted from the PHY layer. A parity bits of the SIG 2030 field may be used for an even parity of 0 to 16 bits of the SIG 2030 field. The Tail bits of the SIG 2030 field may consist of 6 bits and may be set to 0.

The MPDU may include at least one MSDU. In addition, the MPDU may include a MAC header and a trailer. The structure of the MAC header may be as follows.

Figure 23:
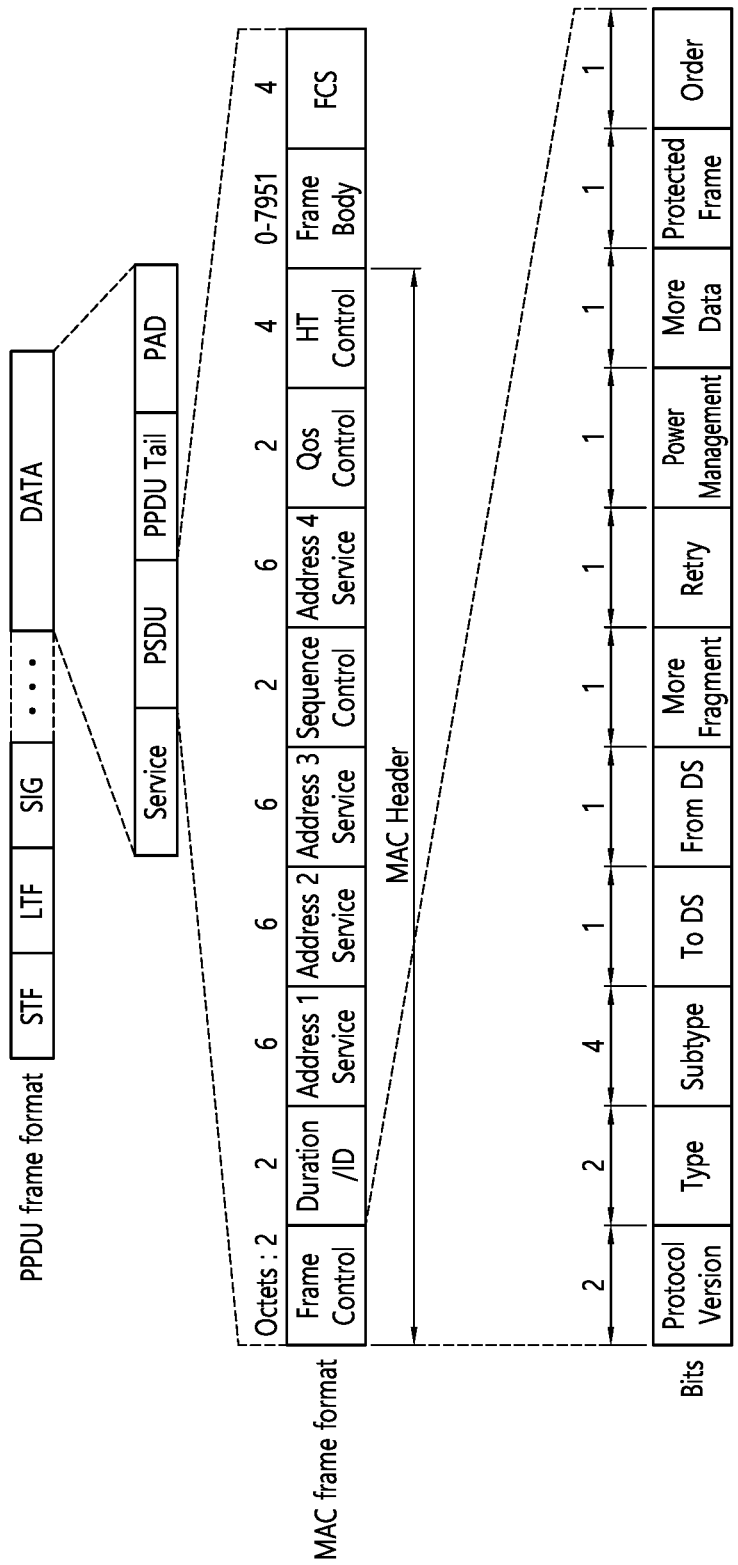
FIG. 23 is a diagram illustrating an embodiment of a MAC header.

FIG. 23 is a diagram illustrating an embodiment of a MAC header.

Referring to FIG. 23, a MAC frame may include a MAC header, a frame body, and a frame check sequence (FCS). The MPDU may be defined according to various MAC frame formats. The MAC frame may be composed of an MPDU, and may be transmitted/received through the PSDU of the data part of the PPDU frame format.

The MAC header may include a frame control field, a duration/identifier (ID) field, an address field, and the like. The frame control field may include control information necessary for frame transmission/reception. The duration/ID field may be set to a time for transmitting a corresponding frame or the like.

The duration/ID field included in the MAC header may be set to a length of 16 bits (for example, B0 to B15). Content included in the duration/ID field may vary depending on a frame type and subtype, whether it is transmitted during a contention free period (CFP), QoS capability of a transmitting STA, and the like. In a control frame whose subtype is PS-Poll, the duration/ID field may include the AID of the transmitting STA (for example, 14 LSB bits), and 2 MSB bits may be set to 1. In frames transmitted during CFP by a point coordinator (PC) or non-QoS STA, the duration/ID field may be set to a fixed value (for example, 32768). In other frames transmitted by the non-QoS STA or control frames transmitted by the QoS STA, the duration/ID field may include a duration value defined for each frame type. In a data frame or a management frame transmitted by the QoS STA, the duration/ID field may include a duration value defined for each frame type. For example, if B15 of the duration/ID field is set to 0, it may indicate that the duration/ID field is used to indicate the TXOP Duration, and B0 to B14 may be used to indicate the actual TXOP Duration. The actual TXOP Duration indicated by B0 to B14 may be any one of 0 to 32767, and the unit may be microseconds (us). When the duration/ID field indicates a fixed TXOP Duration value (for example, 32768), B15 may be 1, and B0 to B14 may be set to 0. Otherwise, when B14 is set to 1 and B15 is set to 1, the duration/ID field may be used to indicate an AID, and B0 to B13 may indicate one AID from 1 to 2007.

The frame control field of the MAC header may include Protocol Version, Type, Subtype, To DS, From DS, More Fragment, Retry, Power Management, More Data, Protected Frame, and Order subfields.

Figure 24:
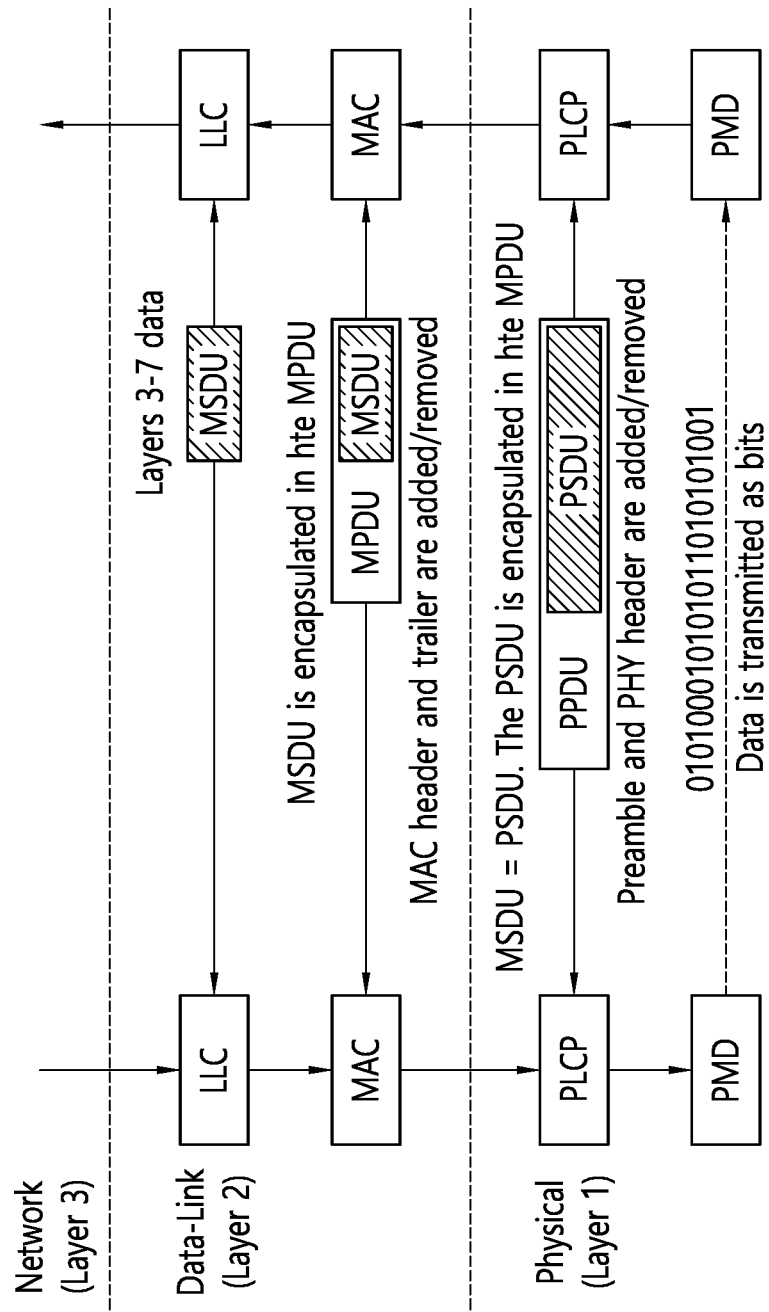
FIG. 24 is a diagram illustrating an operation in each layer of a wireless LAN system.

FIG. 24 is a diagram illustrating an operation in each layer of a wireless LAN system.

Referring to FIG. 24, the transmitting STA and the receiving STA may include a Layer 2 (that is, MAC layer) and a Layer 1 (that is, PHY layer), and may generate MPDUs, PPDUs, and the like, as described in FIGS. 20 to 23. That is, the transmitting STA may generate an MPDU including an MSDU and a MAC header. In addition, the transmitting STA may generate a PPDU by adding a PHY preamble/header and the like to the PSDU corresponding to the generated MPDU.

The receiving STA may obtain the PSDU by removing the PHY preamble/header and the like from the received PPDU, may obtain the MPDU corresponding to the PSDU, may obtain the MSDU by removing the MAC header and the like from the MPDU, and may deliver the obtained MSDU to a higher layer.

As the wired/wireless traffic increases, the time latency-sensitive traffic also increases. Time latency-sensitive traffic is usually real-time audio/video transmission. With the proliferation of multimedia devices, the necessity of transmitting time latency-sensitive traffic in real time in a wireless environment has increased. In a wireless environment, there may be more considerations to support latency-sensitive traffic than in a wired environment. Transmission in a wireless environment is slower than transmission in a wired environment, and there may be a lot of ambient interference.

In a wireless local area network (WLAN), there is no channel monopoly by a central base station. In a WLAN system, terminals must compete equally in an industrial scientific medical (ISM) band. Therefore, it may be more difficult to support traffic that is relatively sensitive to the time delay in a WLAN system. Nevertheless, since time delay-sensitive traffic is increasing, WLAN technology to support time delay-sensitive traffic may be required. Techniques for supporting time delay-sensitive traffic are described below.

The time delay may mean latency defined by the IEEE802.11ax task group. The time delay may mean the time from when a frame is received in the queue of the medium access control (MAC) layer until the transmission in the physical (PHY) layer is finished and an acknowledgment (ACK)/Block ACK is received from the receiving terminal, and the corresponding frame is deleted from the queue of the MAC layer.

Hereinafter, latency traffic may refer to traffic requiring low latency, sensitive to time delay, or important in time delay.

Hereinafter, latency traffic may mean traffic having a new access category different from the conventional one. For example, latency traffic may mean traffic having a different quality of service (QoS) and/or traffic identifier (TID) from the related art. For example, traffic related to a specific AC (or QoS/TID) may be defined as latency traffic, and the remaining ACs (or QoS/TID) may be defined as normal traffic, not latency traffic. Alternatively, latency traffic and normal traffic may have the same AC (or QoS/TID), and latency traffic and normal traffic may be distinguished based on various proposed identification fields (for example, bits of a PHY preamble and/or bits of a MAC header). In IEEE 802.11ax, fields informing the buffer state of the terminal are defined in order to inform the AP of the buffer state of the terminal. For example, the Queue Size subfield included in the QoS Control field is defined. For example, a buffer status report (BSR) control subfield is defined as one of the variants of the A-Control subfield included in the HT Control field. Upon receiving the Queue Size subfield and/or the BSR Control subfield, the AP may more efficiently allocate uplink resources for uplink transmission of the UE. For example, the AP may receive information about the buffer state of the user STA, and may configure a trigger frame for the user STA based on the buffer state of the user STA. In the following example, an uplink resource for uplink transmission may include an uplink resource used for UL MU communication. That is, in the following example, an uplink (UL) resource for uplink transmission may be a UL resource allocated through FIGS. 11 to 13 and the like. The user STA may perform UL-MU communication as shown in FIG. 10 through the UL resource allocated by the AP.

The Queue Size subfield may exist only in the Applicable type shown in Table 5 below, and may consist of 8 bits.

TABLE 5

| Applicable frame (sub) types | Bits 0-3 | Bit 4 | Bits 5-6 | Bit 7 | Bits 8 | Bit 9 | Bit 10 | Bits 11-15 |
|---|---|---|---|---|---|---|---|---|
| QoS CF-Poll and QoS CF-Ack + CF-Poll frames sent by HC | TID | EOSP | Ack Policy | Reserved | TXOP Limit | | | |
| QoS Data + CF-Poll and QoS Data + CF-Ack + CF-Poll frames sent by HC | TID | EOSP | Ack Policy | A-MSDU Present | TXOP Limit | | | |
| QoS Data and QoS Data + CF-Ack frames sent by HC | TID | EOSP | Ack Policy | A-MSDU Present | AP PS Buffer State | | | |
| QoS Null frames sent by HC | TID | EOSP | Ack Policy | Reserved | AP PS Buffer State | | | |
| QoS Data and QoS Data + CF-Ack frames sent by non-AP STAs that are not a TPU buffer STA or a TPU sleep STA in a nonmesh BSS | TID | 0 | Ack Policy | A-MSDU Present | TXOP Duration Requested | | | |
| | TID | 1 | Ack Policy | A-MSDU Present | Queue Size | | | |
| QoS Null frames sent by non-AP STAs that are not a TPU buffer STA or a TPU sleep STA in a nonmesh BSS | TID | 0 | Ack Policy | Reserved | TXOP Duration Requested | | | |
| | TID | 1 | Ack Policy | Reserved | Queue Size | | | |

The Queue Size subfield may inform the size of data currently stored in the buffer among TID traffic related to the TID subfield. In IEEE 802.11ax, the unit used in the Queue Size subfield may be determined as 16, 256, 2048, or 32768 bytes according to the buffer size. For example, the Queue Size subfield is n-bit information (for example, 8-bit information), and may be used to report the size of uplink traffic having a specific TID to the AP. The Queue Size subfield may be included in the MAC header of the uplink PPDU of the user STA and delivered to the AP. The AP may allocate uplink resources for the user STA based on the Queue Size subfield. For example, the AP may use the reported Queue Size subfield when setting the length of the TXOP interval for UL-MU operation or setting the frequency/spatial resource for the user STA.

FIG. 25 is a diagram illustrating an example of a BSR control subfield.

Referring to FIG. 25, the BSR control subfield (or BSR subfield) may include ACI Bitmap, Delta TID, ACI High, Scaling Factor, Queue Size High, and Queue Size All fields. The Queue Size High and Queue Size All fields may include information related to the size of uplink traffic of the user STA. Both the queue size subfield and the BSR control subfield may include information related to the size of uplink traffic of the user STA. The Queue Size subfield and/or the BSR control subfield may be used for allocating uplink resources (for example, time/frequency/spatial resources for UL-MU communication) for the user STA.

Hereinafter, subfields included in the BSR control subfield will be described.

ACI Bitmap: Access category reported by UE
    Delta TID: Providing TID information associated with ACI Bitmap subfield values
    ACI High: The access category in which the Queue Size is indicated by the Queue Size High subfield
    Scaling Factor: Information related to the unit to be used in the Queue Size High and Queue Size All subfields
    Queue Size High: Queue size information for the access category indicated by the ACI High subfield
    Queue Size All: Queue size information for the entire access categories indicated by the ACI Bitmap subfield When the STA notifies the AP of information on the current uplink traffic (that is, latency traffic) in order to transmit the latency traffic, the AP may allocate a UL resource in consideration of the latency of the uplink traffic (that is, latency traffic). Hereinafter, a latency BSR control subfield for latency traffic is described.

In order to transmit additional information for latency traffic, information related to latency traffic may be transmitted. That is, information related to traffic for which latency is important may be transmitted. A field including information related to latency traffic may be called by various names, such as a latency BSR control subfield, a latency BSR subfield, and latency BSR information. Hereinafter, it may be referred to as a latency BSR subfield.

The latency BSR subfield may include latency related information to be reported by the STA. For example, the latency BSR subfield may include information related to latency-sensitive traffic (that is, latency traffic) that the STA has. That is, the latency BSR subfield may include latency BSR information. The latency BSR subfield may include some or all of the following information.

1. Time Information

The latency BSR subfield may include information related to a time (or packet arrival time) at which each packet enters a queue (for example, a buffer). The terminal (that is, the STA) and the AP may exchange information related to the required latency of traffic. Accordingly, when the AP obtains information on the time at which the packet entered the buffer, the AP may calculate the remaining time for the corresponding packet. That is, based on the time at which the packet entered the buffer, if a packet is not transmitted, the AP may acquire information related to the time remaining until the time when the packet is deleted from the buffer. That is, the AP may acquire information related to the time remaining until the time when the packet is to be transmitted, based on the time at which the packet enters the buffer. That is, the AP may acquire information related to the time remaining until the delay bound of the corresponding packet based on the time at which the packet entered the buffer. The AP may allocate the UL resource to the terminal (that is, the STA) based on information related to the queue of each packet (for example, the arrival time (or packet arrival time) in the buffer) included in the BSR field.

The latency BSR subfield may include information related to the time remaining until the delay bound of each packet. That is, since the latency BSR subfield directly includes information related to the time remaining until the delay bound of each packet, the AP can acquire information related to the time remaining until the delay bound of the corresponding packet even if the AP does not calculate the time remaining until the delay bound of the corresponding packet based on the packet arrival time and the like. That is, the AP may acquire information related to the remaining time before the packet is dropped based on the BSR field. That is, the terminal (STA) may transmit information related to the remaining time until the packet is dropped to the AP. The AP may allocate the UL resource to the terminal (that is, the STA) based on information related to the time remaining until the Delay bound of each packet included in the BSR field.

2. Size Information

The latency BSR subfield may include information related to the number of buffered packets stored in the buffer.

The latency BSR subfield may include information related to the length of buffered packets stored in the buffer.

The AP may determine the size of a resource to be allocated to the terminal based on information related to the number of packets stored in the buffer and the size of each packet stored in the buffer included in the latency BSR subfield.

Figure 26:
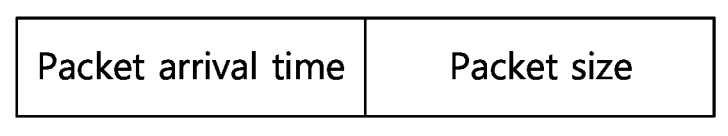

FIG. 26 shows an embodiment of a latency BSR subfield.

Referring to FIG. 26, the latency BSR subfield may include, for example, time information and size information one by one. Specific bits of the latency BSR subfield may vary according to implementation.

FIG. 26 is only an example, and the latency BSR subfield may include both the time information and the size information described above, or may include only a part of the time information and the size information described above. For example, the latency BSR subfield may include information on a packet arrival time, the number of packets stored in the buffer, and the size of each packet stored in the buffer.

Some of the latency BSR information may also be used to transmit information on traffic that is not latency traffic (that is, traffic sensitive to time delay). For example, packet arrival time information for traffic in which latency is not important may also be included in the latency BSR subfield. For example, the AP may allocate a UL resource to the terminal based on packet arrival time information for traffic for which latency is not important. Accordingly, the terminal may transmit traffic information including packet arrival time information of traffic for which latency is not important to the AP.

Hereinafter, a method for transmitting latency BSR information is described.

1. The QoS control field may include a Queue Size subfield. In addition, the latency BSR subfield may be defined using a variant of the A-Control subfield included in the HT Control field. For example, the PPDU may include a Queue Size subfield, a BSR Control subfield, and a Latency BSR subfield. For example, the Queue Size subfield (and/or the BSR control subfield) and the Latency BSR subfield may be included in the MAC header of the same PPDU. For example, the queue size subfield (and/or the BSR control subfield) and the latency BSR subfield may be included in MAC headers of different PPDUs, and the different PPDUs may be transmitted in the same TXOP.

The Queue Size subfield may include information related to a queue size of latency traffic, or information related to a queue size of traffic other than latency traffic or all traffic. Specifically, 1) for example, the Queue size subfield and/or the BSR control subfield may be used for normal traffic queue size information other than latency traffic, and the latency BSR subfield may be used for traffic queue size information of latency traffic. 2) For example, the Queue Size subfield and/or BSR control subfield may be used for queue size information for both latency traffic and normal traffic, and the latency BSR subfield may be used for traffic queue size information of latency traffic. That is, in both 1) and 2), the latency BSR subfield may include only information related to the queue size of latency traffic. However, in 1), the Queue size subfield and/or the BSR control subfield may include only normal traffic queue size information, in 2), the queue size subfield and/or the BSR control subfield may include both normal traffic queue size information and latency traffic queue size information. It is not limited to the above embodiment, and various examples of queue size information may be transmitted.

2. For example, the latency BSR subfield may be transmitted independently. The latency BSR subfield may be included in another frame and transmitted or may be transmitted in another TXOP separately from the Queue Size subfield and/or the BSR control subfield. For example, the Queue Size subfield (and/or the BSR control subfield) and the Latency BSR subfield may be included in different PPDUs (that is, in MAC headers of different PPDUs). For example, the Queue Size subfield (and/or the BSR control subfield) and the latency BSR subfield may be transmitted through different TXOP intervals.

3. For example, some subfields of the existing BSR (that is, QoS subfield and/or BSR control subfield) and the latency BSR subfield may be integrated. For example, latency BSR information may be included instead of some fields of the existing BSR (that is, QoS subfield and/or BSR control subfield).

For example, since the ACI High and Queue Size High subfields of the BSR control subfield inform the queue size information of a specific AC, this information is omitted and replaced with Latency BSR information. That is, the ACI High and Queue Size High subfields of the BSR control subfield may include latency BSR information. This is because queue size information of a specific AC can be informed by the QoS Control field. For example, the Queue Size subfield (and/or the BSR control subfield) and the Latency BSR subfield may consist of one field. For example, the ACI High and Queue Size High subfields of FIG. 25 may be omitted and Latency BSR information may be included instead. For example, in order to transmit only latency-related information, the Queue Size All subfield of FIG. 25, which is information on the entire queue size, may be omitted, and latency BSR information may be included instead. Alternatively, the latency BSR field may be included instead of other subfields of the BSR control subfield.

Figure 27:
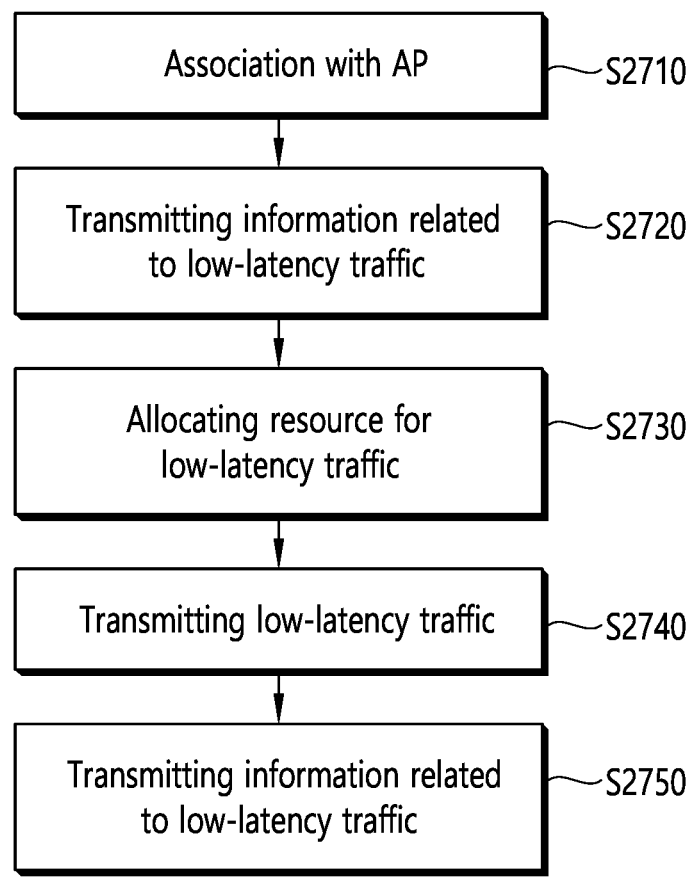
FIG. 27 is a flowchart illustrating an embodiment of an STA operation.

FIG. 27 is a flowchart illustrating an embodiment of an STA operation.

Referring to FIG. 27, an STA may be associated with an AP (S2710).

For example, the STA may transmit capability information on whether to support low latency traffic to the AP. That is, the user STA may transmit information on whether it supports low latency traffic through a beacon, a probe request, a probe response, an association request, an association response, other management frames, other control frames, and the like. Capability information transmission may be performed in the association step or may be performed in a separate step.

For example, the STA may transmit capability information on whether to support Latency BSR to the AP. Latency BSR may refer to an operation of reporting "latency BSR information" to the AP according to the above-described example. The STA may transmit information on whether it supports the Latency BSR through a beacon, probe request, probe response, association request, association response, other management frames, other control frames, and the like. Capability information transmission may be performed in the association step or may be performed in a separate step.

The STA may transmit information related to low-latency traffic (S2720). For example, the STA may transmit a first physical protocol data unit (PPDU) including information related to low-latency traffic. For example, the low-latency traffic may be traffic requiring a latency less than or equal to a threshold value.

The STA may transmit information on latency BSR and information based on a Queue Size subfield (and/or BSR control subfield) to the AP. As described above, step S2720 may be performed based on the MAC header of the PPDU. In order to transmit a PPDU including information on latency BSR and the like to the AP, the STA may generate a MAC header including information on latency BSR based on at least one of the examples of FIGS. 20 to 24.

For example, information related to low-latency traffic may be included in the latency BSR subfield.

For example, the latency BSR subfield may be transmitted independently. The latency BSR subfield may be included in another frame and transmitted separately from the Queue Size subfield and/or the BSR control subfield, or may be transmitted in another TXOP. For example, the Queue Size subfield (and/or the BSR control subfield) and the Latency BSR subfield may be included in different PPDUs (that is, in MAC headers of different PPDUs). For example, the queue size subfield (and/or the BSR control subfield) and the latency BSR subfield may be transmitted through different TXOP intervals. For example, the Queue size subfield and/or the BSR control subfield may be used for normal traffic queue size information, not for latency traffic.

The latency BSR subfield may include latency related information to be reported by the STA. For example, the latency BSR subfield may include information related to latency-sensitive traffic (that is, latency traffic) that the STA has. That is, the latency BSR subfield may include latency BSR information. The latency BSR subfield may include some or all of the following information.

1. Time Information

The latency BSR subfield may include information related to a time (or packet arrival time) at which each packet enters a queue (for example, a buffer). The STA and the AP may exchange information related to the required latency of traffic. Accordingly, when the AP obtains information on the time at which the packet entered the buffer, the AP may calculate the remaining time for the corresponding packet. That is, based on the time at which the packet entered the buffer, if a packet is not transmitted, the AP may acquire information related to the time remaining until the time when the packet is deleted from the buffer. That is, the AP may acquire information related to the time remaining until the time when the packet is to be transmitted, based on the time at which the packet enters the buffer. That is, the AP may acquire information related to the time remaining until the delay bound of the corresponding packet based on the time at which the packet entered the buffer. The AP may allocate the UL resource to the STA based on information related to the queue of each packet (for example, the arrival time (or packet arrival time) in the buffer) included in the BSR field. Accordingly, the AP can obtain the effect of allocating sufficient resources so that the STA having low-latency traffic can perform fast transmission.

The latency BSR subfield may include information related to the time remaining until the delay bound of each packet. That is, since the latency BSR subfield directly includes information related to the time remaining until the delay bound of each packet, the AP can acquire information related to the time remaining until the delay bound of the corresponding packet even if the AP does not calculate the time remaining until the delay bound of the corresponding packet based on the packet arrival time and the like. That is, the AP may acquire information related to the remaining time before the packet is dropped based on the BSR field. That is, the terminal (STA) may transmit information related to the remaining time until the packet is dropped to the AP. The AP may allocate the UL resource to the terminal (that is, STA) based on information related to the time remaining until the Delay bound of each packet included in the BSR field. Accordingly, the AP can obtain the effect of allocating sufficient resources so that the STA having low-latency traffic can perform fast transmission.

2. Size Information

The latency BSR subfield may include information related to the number of buffered packets stored in the buffer.

The latency BSR subfield may include information related to the length of buffered packets stored in the buffer.

The AP may determine the size of a resource to be allocated to the STA based on information related to the number of packets stored in the buffer and the size of each packet stored in the buffer included in the latency BSR subfield. That is, the AP can obtain the effect of being able to determine the amount of resources required to satisfy the latency of the STA having traffic requiring low latency.

Since the STA can separately transmit BSR information for latency traffic, the AP can obtain the effect of efficiently performing resource allocation for latency traffic. Accordingly, the STA can also obtain the effect of transmitting the latency traffic to satisfy the required latency.

The STA may be allocated a resource for low-latency traffic from the AP (S2730). Upon receiving the latency BSR subfield, the AP may more efficiently allocate uplink resources for uplink transmission of the STA. For example, the AP may receive information about the buffer state of the STA, and may configure a trigger frame for the user STA based on the buffer state of the STA. The uplink resource for uplink transmission may include an uplink resource used for UL MU communication. That is, an uplink (UL) resource for uplink transmission may be a UL resource allocated through FIGS. 11 to 13 and the like. The user STA may perform UL-MU communication as shown in FIG. 10 through the UL resource allocated by the AP. That is, the AP may allocate a resource to the STA based on the information related to the low-latency traffic received in step S2720 (that is, the latency BSR subfield).

The STA may transmit low-latency traffic through the resource allocated to the AP (S2740). For example, the STA may transmit a second PPDU including low-latency traffic through the resource allocated from the AP. For example, the low-latency traffic may be traffic requiring a latency less than or equal to a threshold value.

The STA may configure a PPDU including low latency traffic and transmit it to the AP. A specific method for configuring the PPDU may be based on at least one of the examples of FIGS. 20 to 24. For example, the STA may configure a data field (that is, PSDU) based on a MAC PDU including low latency traffic and a MAC header for the MAC PDU. For example, the MAC header may include information about the type of traffic (that is, low latency type) included in the data field. In addition, the STA may configure the EHT-PPDU by attaching the above-described PHY preamble/signal (for example, L-STF, L-LTF, L-SIG, EHT-SIG, EHT-STF, EHT-LTF) to the data field. For example, the PHY preamble/signal may include information on the type of traffic (that is, low latency type).

The STA may transmit information related to low-latency traffic (S2750). For example, the STA may transmit a third physical protocol data unit (PPDU) including information related to low-latency traffic. For example, the low-latency traffic may be traffic requiring a latency less than or equal to a threshold. Information related to low-latency traffic may be transmitted at any time. For example, the STA may periodically transmit information related to low-latency traffic to the AP. For example, the STA may aperiodically transmit information related to low latency traffic to the AP. For example, the STA may transmit information related to low latency traffic to the AP whenever low latency traffic occurs or a change occurs in low latency traffic stored in the queue.

For example, the first PPDU and the second PPDU may be transmitted in different transmission opportunities (TXOPs). For example, the low-latency traffic may have an access category for the low-latency traffic.

Figure 28:
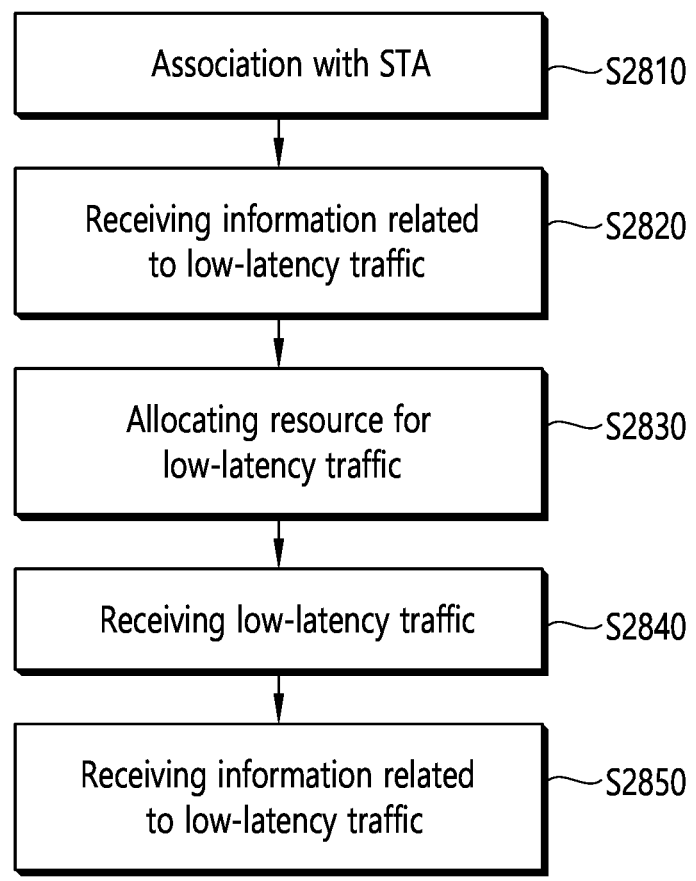
FIG. 28 is a flowchart illustrating an embodiment of an AP operation.

FIG. 28 is a flowchart illustrating an embodiment of an AP operation.

Referring to FIG. 28, the AP may be associated with the STA (S2810).

For example, the AP may transmit capability information on whether to support low latency traffic to the STA. That is, the AP may transmit information on whether it supports low latency traffic through a beacon, a probe request, a probe response, an association request, an association response, other management frames, other control frames, and the like. Capability information transmission may be performed in the association step or may be performed in a separate step.

For example, the AP may transmit capability information on whether to support Latency BSR to the STA. Latency BSR may refer to an operation of reporting "latency BSR information" to the AP according to the above-described example. The STA may transmit information on whether it supports the Latency BSR through a beacon, probe request, probe response, association request, association response, other management frames, other control frames, and the like. Capability information transmission may be performed in the association step or may be performed in a separate step.

AP may receive information related to low latency traffic (S2820). For example, the AP may receive a first physical protocol data unit (PPDU) including information related to low-latency traffic (traffic). For example, the low-latency traffic may be traffic requiring a latency less than or equal to a threshold.

The AP may receive information on latency BSR and information based on a Queue Size subfield (and/or BSR control subfield) from the STA. As described above, step S2820 may be performed based on the MAC header of the PPDU. In order to transmit a PPDU including latency BSR information and the like to the AP, the STA may generate a MAC header including latency BSR information based on at least one of the examples of FIGS. 20 to 24.

For example, information related to low-latency traffic may be included in the latency BSR subfield.

For example, the latency BSR subfield may be transmitted independently. The latency BSR subfield may be included in another frame and transmitted separately from the Queue Size subfield and/or the BSR control subfield, or may be transmitted in another TXOP. For example, the Queue Size subfield (and/or the BSR control subfield) and the Latency BSR subfield may be included in different PPDUs (that is, in MAC headers of different PPDUs). For example, the queue size subfield (and/or the BSR control subfield) and the latency BSR subfield may be transmitted through different TXOP intervals. For example, the Queue size subfield and/or the BSR control subfield may be used for normal traffic queue size information, not for latency traffic.

The latency BSR subfield may include latency related information to be reported by the STA. For example, the latency BSR subfield may include information related to latency-sensitive traffic (that is, latency traffic) that the STA has. That is, the latency BSR subfield may include latency BSR information. The latency BSR subfield may include some or all of the following information.

1. Time Information

The latency BSR subfield may include information related to a time (or packet arrival time) at which each packet enters a queue (for example, a buffer). The STA and the AP may exchange information related to the required latency of traffic. Accordingly, when the AP obtains information on the time at which the packet entered the buffer, the AP may calculate the remaining time for the corresponding packet. That is, based on the time at which the packet entered the buffer, if a packet is not transmitted, the AP may acquire information related to the time remaining until the time when the packet is deleted from the buffer. That is, the AP may acquire information related to the time remaining until the time when the packet is to be transmitted, based on the time at which the packet enters the buffer. That is, the AP may acquire information related to the time remaining until the delay bound of the corresponding packet based on the time at which the packet entered the buffer. The AP may allocate the UL resource to the STA based on information related to the queue of each packet (for example, the arrival time (or packet arrival time) in the buffer) included in the BSR field.

The latency BSR subfield may include information related to the time remaining until the delay bound of each packet. That is, since the latency BSR subfield directly includes information related to the time remaining until the delay bound of each packet, the AP can acquire information related to the time remaining until the delay bound of the corresponding packet even if the AP does not calculate the time remaining until the delay bound of the corresponding packet based on the packet arrival time and the like. That is, the AP may acquire information related to the remaining time before the packet is dropped based on the BSR field. That is, the terminal (STA) may transmit information related to the remaining time until the packet is dropped to the AP. The AP may allocate the UL resource to the STA based on information related to the time remaining until the Delay bound of each packet included in the BSR field.

2. Size Information

The latency BSR subfield may include information related to the number of buffered packets stored in the buffer.

The latency BSR subfield may include information related to the length of buffered packets stored in the buffer.

The AP may determine the size of a resource to be allocated to the STA based on information related to the number of packets stored in the buffer and the size of each packet stored in the buffer included in the latency BSR subfield.

Since the STA can separately transmit BSR information for latency traffic, the AP can obtain the effect of efficiently performing resource allocation for latency traffic. Accordingly, the STA can also obtain the effect of transmitting the latency traffic to satisfy the required latency.

The AP may allocate a resource for low-latency traffic to the STA (S2830). Upon receiving the latency BSR subfield, the AP may more efficiently allocate uplink resources for uplink transmission of the STA. For example, the AP may receive information about the buffer state of the STA, and may configure a trigger frame for the user STA based on the buffer state of the STA. The uplink resource for uplink transmission may include an uplink resource used for UL MU communication. That is, an uplink (UL) resource for uplink transmission may be a UL resource allocated through FIGS. 11 to 13 and the like. The user STA may perform UL-MU communication as shown in FIG. 10 through the UL resource allocated by the AP. That is, the AP may allocate a resource to the STA based on the information related to the low-latency traffic received in step S2820 (that is, the latency BSR subfield).

The AP may receive low-latency traffic through the resource allocated from the STA (S2840). For example, the STA may transmit a second PPDU including low-latency traffic through the resource allocated from the AP. For example, the low-latency traffic may be traffic requiring a latency less than or equal to a threshold value.

The STA may configure a PPDU including low latency traffic and transmit it to the AP. A specific method for configuring the PPDU may be based on at least one of the examples of FIGS. 20 to 24. For example, the STA may configure a data field (that is, PSDU) based on a MAC PDU including low latency traffic and a MAC header for the MAC PDU. For example, the MAC header may include information about the type of traffic (that is, low latency type) included in the data field. In addition, the STA may configure the EHT-PPDU by attaching the above-described PHY preamble/signal (for example, L-STF, L-LTF, L-SIG, EHT-SIG, EHT-STF, EHT-LTF) to the data field. For example, the PHY preamble/signal may include information on the type of traffic (that is, low latency type).

AP may receive information related to low-latency traffic (S2850). For example, the AP may receive a third physical protocol data unit (PPDU) including information related to low-latency traffic. For example, the low-latency traffic may be traffic requiring a latency less than or equal to a threshold. Information related to low-latency traffic may be transmitted at any time. For example, the AP may periodically receive information related to low-latency traffic from the STA. For example, the AP may receive information related to low-latency traffic aperiodically from the STA. For example, the AP may receive information related to low-latency traffic from the STA whenever low-latency traffic occurs or a change occurs in the low-latency traffic stored in the queue.

For example, the first PPDU and the second PPDU may be transmitted in different transmission opportunities (TXOPs). For example, the low-latency traffic may have an access category for the low-latency traffic.

Some of the detailed steps shown in the examples of FIGS. 27 and 28 may be omitted, and other steps may be added. For example, step S2710 for association with the AP of FIG. 27, the step S2750 for transmission of information related to low latency traffic can be omitted. The order of the steps shown in FIGS. 27 and 28 may vary.

The technical features of the present specification described above may be applied to various devices and methods. For example, the above-described technical features of the present specification may be performed/supported through the apparatus of FIGS. 1 and/or 19. For example, the above-described technical features of the present specification may be applied only to a part of FIGS. 1 and/or 19. For example, the technical features of the present specification described above may be implemented based on the processing chips 114 and 124 of FIG. 1, may be implemented based on the processors 111 and 121 and the memories 112 and 122 of FIG. 1, or may be implemented based on the processor 610 and the memory 620 of FIG. 19. For example, the apparatus of the present specification includes a memory and a processor operatively coupled to the memory. The processor may be configured to transmit a first physical protocol data unit (PPDU) including information related to low-latency traffic. The low-latency traffic may be traffic requiring a latency less than or equal to a threshold value. The processor may be configured to receive allocation of a resource for the low-latency traffic. The processor may be configured to transmit the second PPDU including the low-latency traffic through the resource.

The technical features of the present specification may be implemented based on a computer readable medium (CRM). For example, a CRM proposed by the present specification may store instructions which, based on being executed by at least one processor of a station (STA) in a wireless local area network system, cause the STA to perform operations. The operations may include the step of transmitting a first physical protocol data unit (PPDU) including information related to wireless low-latency traffic. The low-latency traffic may be traffic requiring a latency less than or equal to a threshold value. The operations may include the step of receiving an allocation of a resource for the low-latency traffic. The operations may include the step of transmitting the second PPDU including the low-latency traffic through the resource. The instructions stored in the CRM of the present disclosure may be executed by at least one processor. At least one processor related to CRM in the present specification may be the processors 111 and 121 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network system, the method comprising:
    transmitting, by a station (STA), a first physical protocol data unit (PPDU) including a legacy signal (L-SIG) field, a repeated legacy signal (RL-SIG) field which is contiguous to the L-SIG field and is a repeat of the L-SIG field, and a universal (U-SIG) field which is contiguous to the L-SIG,
    wherein the L-SIG field includes a length field which is set to a value satisfying a condition that a remainder is zero when the length field is divided by three,
    wherein the U-SIG field includes version independent bits and version dependent bits being contiguous to the version independent bits,
    wherein the U-SIG field has a length of 2 symbols,
    wherein the version independent bits include a first subfield related to a physical version of the first PPDU, and the first subfield has a length of 3 bits,
    wherein the first PPDU further includes a Medium Access Control (MAC) header including information related to law latency traffic,
    wherein the low-latency traffic is traffic requiring a latency less than or equal to a threshold value,
    wherein the information related to low latency traffic includes at least one of information related to a time point at which the low latency traffic is stored in a buffer and information related to the threshold value;
    receiving, by the STA, an allocation of a resource for the low latency traffic; and
    transmitting, by the STA via the resource, a second PPDU including the low latency traffic.

2. The method of claim 1, wherein the first PPDU and the second PPDU are transmitted in different transmission opportunities (TXOPs).

3. The method of claim 1, wherein the low latency traffic has an access category for the low latency traffic.

4. A station (STA) in a wireless local area network system, the STA comprises,
    at least one transceiver for transmitting and receiving a radio signal; and
    at least one processor coupled to the at least one transceiver, wherein the at least one processor is configured to:
    transmit a first physical protocol data unit (PPDU) including a legacy signal (L-SIG) field, a repeated legacy signal (RL-SIG) field which is contiguous to the L-SIG field and is a repeat of the L-SIG field, and a universal (U-SIG) field which is contiguous to the L-SIG, wherein the L-SIG field includes a length field which is set to a value satisfying a condition that a remainder is zero when the length field is divided by three, wherein the U-SIG field includes version independent bits and version dependent bits being contiguous to the version independent bits, wherein the U-SIG field has a length of 2 symbols, wherein the version independent bits include a first subfield related to a physical version of the first PPDU, and the first subfield has a length of 3 bits, wherein the first PPDU further includes a Medium Access Control (MAC) header including information related to law latency traffic, wherein the low-latency traffic is traffic requiring a latency less than or equal to a threshold value, wherein the information related to low latency traffic includes at least one of information related to a time point at which the low latency traffic is stored in a buffer and information related to the threshold value;

receive an allocation of a resource for the low latency traffic; and transmit, via the resource, a second PPDU including the low latency traffic.

5. The STA of claim 4, wherein the first PPDU and the second PPDU are transmitted in different transmission opportunities (TXOPs).

6. The STA of claim 4, wherein the low latency traffic has an access category for the low latency traffic.

7. An access point (AP) in a wireless local area network system, the AP comprises, a transceiver for transmitting and receiving a radio signal; and a processor coupled to the transceiver, wherein the processor is configured to:

receive a first physical protocol data unit (PPDU) including a legacy signal (L-SIG) field, a repeated legacy signal (RL-SIG) field which is contiguous to the L-SIG field and is a repeat of the L-SIG field, and a universal (U-SIG) field which is contiguous to the L-SIG, wherein the L-SIG field includes a length field which is set to a value satisfying a condition that a remainder is zero when the length field is divided by three, wherein the U-SIG field includes version independent bits and version dependent bits being contiguous to the version independent bits, wherein the U-SIG field has a length of 2 symbols, wherein the version independent bits include a first subfield related to a physical version of the first PPDU, and the first subfield has a length of 3 bits, wherein the first PPDU further includes a Medium Access Control (MAC) header including information related to law latency traffic, wherein the low-latency traffic is traffic requiring a latency less than or equal to a threshold value, wherein the information related to low latency traffic includes at least one of information related to a time point at which the low latency traffic is stored in a buffer and information related to the threshold value;

allocate a resource for the low latency traffic; and receive, via the resource, a second PPDU including the low latency traffic.

* * * * *